(12) United States Patent
Huang

(10) Patent No.: US 8,483,758 B2
(45) Date of Patent: Jul. 9, 2013

(54) MODULAR MOBILE ACCESSORY FOR MOBILE DEVICE

(75) Inventor: Daniel Huang, Irvine, CA (US)

(73) Assignee: Mophie, Inc., Santa Ana, CA (US)

( * ) Notice: Subject to any disclaimer, the term of this patent is extended or adjusted under 35 U.S.C. 154(b) by 0 days.

(21) Appl. No.: 13/111,845

(22) Filed: May 19, 2011

(65) Prior Publication Data

US 2011/0287808 A1   Nov. 24, 2011

Related U.S. Application Data

(60) Provisional application No. 61/346,386, filed on May 19, 2010.

(51) Int. Cl.
*H04M 1/00* (2006.01)
(52) U.S. Cl.
USPC .......... 455/557; 455/575.1; 455/558; 429/96; 361/679.41; 361/679.56
(58) Field of Classification Search
USPC ................ 455/558, 557; 429/96; 361/679.41, 361/679.56
See application file for complete search history.

(56) References Cited

U.S. PATENT DOCUMENTS

| | | |
|---|---|---|
| 5,001,772 A | 3/1991 | Holcomb et al. |
| 5,368,159 A | 11/1994 | Doria |
| 5,508,123 A | 4/1996 | Fan |
| D372,896 S | 8/1996 | Nagele et al. |
| 5,586,002 A | 12/1996 | Notarianni |
| 5,604,050 A | 2/1997 | Brunette et al. |
| 5,610,979 A | 3/1997 | Yu |
| 5,708,707 A | 1/1998 | Halttlunen et al. |
| 5,711,013 A | 1/1998 | Collett et al. |
| D392,248 S | 3/1998 | Johansson |
| D392,939 S | 3/1998 | Finke-Anlauff |
| 5,786,106 A | 7/1998 | Armani |
| D400,495 S | 11/1998 | Deslyper et al. |
| 5,973,477 A | 10/1999 | Chang |
| 6,043,626 A | 3/2000 | Snyder et al. |
| 6,171,138 B1 | 1/2001 | Lefebvre et al. |
| 6,184,654 B1 | 2/2001 | Bachner, III et al. |
| 6,208,115 B1 | 3/2001 | Binder |
| 6,317,313 B1 | 11/2001 | Mosgrove et al. |
| 6,324,380 B1 | 11/2001 | Kiuchi et al. |
| D460,411 S | 7/2002 | Wang |
| 6,538,413 B1 | 3/2003 | Beard et al. |
| 6,555,990 B1 | 4/2003 | Yang |
| 6,614,722 B2 | 9/2003 | Polany et al. |
| 6,992,461 B2 | 1/2006 | Liang et al. |
| 7,166,987 B2 | 1/2007 | Lee et al. |
| D547,056 S | 7/2007 | Griffin et al. |
| D547,057 S | 7/2007 | Griffin et al. |

(Continued)

OTHER PUBLICATIONS

Notification of Transmittal of the International Search Report and the Written Opinion of the International Searching Authority, or the Declaration dated Jul. 13, 2011 for PCT/US2011/037249 based on Parent U.S. Appl. No. 61/346,386.

(Continued)

*Primary Examiner* — Amancio Gonzalez
(74) *Attorney, Agent, or Firm* — Duane Morris LLP

(57) ABSTRACT

Accessories for mobile devices. Embodiments include an external protective case and/or holster for mobile electronic devices, where the external protective case/holster incorporates a battery pack, a payment processing device, television signal receiver, and/or a modular multi-input/output device.

20 Claims, 36 Drawing Sheets

U.S. PATENT DOCUMENTS

| | | | |
|---|---|---|---|
| D556,681 S | 12/2007 | Kim | |
| D558,972 S | 1/2008 | Oh | |
| D558,973 S | 1/2008 | Hussaini et al. | |
| D561,092 S | 2/2008 | Kim | |
| 7,336,973 B2* | 2/2008 | Goldthwaite et al. | 455/558 |
| 7,400,917 B2 | 7/2008 | Wood et al. | |
| D575,056 S | 8/2008 | Tan | |
| 7,428,427 B2 | 9/2008 | Brunstrom et al. | |
| D581,151 S | 11/2008 | Aipa | |
| D582,149 S | 12/2008 | Tan | |
| 7,479,759 B2 | 1/2009 | Vilanov et al. | |
| D587,896 S | 3/2009 | Aipa | |
| 7,612,997 B1 | 11/2009 | Diebel et al. | |
| 7,782,610 B2 | 8/2010 | Diebel et al. | |
| 8,077,453 B2* | 12/2011 | Swan et al. | 361/679.41 |
| 2001/0054148 A1 | 12/2001 | Hoornaert | |
| 2002/0147035 A1 | 10/2002 | Su | |
| 2003/0096642 A1 | 5/2003 | Bessa et al. | |
| 2003/0218445 A1 | 11/2003 | Behar | |
| 2003/0228866 A1 | 12/2003 | Pezeshki | |
| 2004/0097256 A1 | 5/2004 | Kujawski | |
| 2004/0104268 A1 | 6/2004 | Bailey | |
| 2005/0090301 A1 | 4/2005 | Lange et al. | |
| 2005/0231159 A1 | 10/2005 | Jones et al. | |
| 2005/0247787 A1 | 11/2005 | Von Mueller et al. | |
| 2005/0248312 A1 | 11/2005 | Cao et al. | |
| 2006/0058073 A1 | 3/2006 | Kim | |
| 2006/0063569 A1 | 3/2006 | Jacobs | |
| 2006/0099999 A1 | 5/2006 | Park | |
| 2007/0152633 A1 | 7/2007 | Lee | |
| 2007/0167190 A1 | 7/2007 | Moosavi et al. | |
| 2007/0236180 A1 | 10/2007 | Rodgers | |
| 2007/0297149 A1 | 12/2007 | Richardson et al. | |
| 2008/0007214 A1 | 1/2008 | Cheng | |
| 2008/0096620 A1 | 4/2008 | Lee et al. | |
| 2008/0108395 A1 | 5/2008 | Lee et al. | |
| 2008/0123287 A1 | 5/2008 | Rossell et al. | |
| 2008/0132289 A1 | 6/2008 | Wood et al. | |
| 2009/0069050 A1 | 3/2009 | Jain | |
| 2009/0073650 A1 | 3/2009 | Huang | |
| 2009/0143104 A1 | 6/2009 | Loh | |
| 2009/0144456 A1 | 6/2009 | Gelf | |
| 2009/0186264 A1* | 7/2009 | Huang | 429/96 |
| 2010/0026589 A1 | 2/2010 | Dou | |
| 2010/0064883 A1* | 3/2010 | Gynes | 84/645 |

OTHER PUBLICATIONS

Notification of Transmittal of the International Search Report and the Written Opinion of the International Searching Authority, or the Declaration dated Jul. 13, 2011 for PCT/US2011/037254 based on Parent U.S. Appl. No. 61/346,386.

Notification of Transmittal of the International Search Report and the Written Opinion of the International Searching Authority, or the Declaration dated Jul. 19, 2011 for PCT/US2011/037244 based on Parent U.S. Appl. No. 61/346,386.

Notification of Transmittal of the International Search Report and the Written Opinion of the International Searching Authority, or the Declaration dated Sep. 22, 2011 for PCT/US2011/037257 based on Parent U.S. Appl. No. 61/346,386.

Mophie Juice Pack iPhone 1G Product Reference, May 1, 2008, 22 pages.

Horwitz, Jeremy; "Kensington Mini Battery Pack and Charger for iPhone and iPod," iLounge; May 16, 2008; available at http://www.ilounge.com/index.php/reviews/entry/kensington-mini-battery-pack-and-charger-for-iphone-and-ipod/; retrieved May 12, 2009; 3 pages.

Rafferty, Sven; Mybat External Battery for iPhone and iPod; SvenOnTech; May 18, 2008; available at <http://sventech,com/reviews/?p=74>; retrieved May 12, 2009; 4 pages.

Rees, Dave; "Richard Solo Backup Battery for iPhone/iPod Review," The Gadgeteer Jun. 16, 2008; available at http://the-gadgeteer.com/2008/06/16/richard_solo_backup_battery_for_iphone_ipod/; retrieved May 12, 2009; 8 pages.

"Cheap DIY iPhone External Battery"; Michael Fisher's Web Log; Jul. 22, 2008; available at http://fastdad.wordpress.com/2008/07/22/cheap-diy-iphone-external-battery/>; retrieved May 12, 2009 10 pages.

Mophie Juice Pack iPhone 3G Product Reference, Aug. 4, 2008, 33 pages.

"Mini Battery Pack and Charger for iPhone and iPod," Kensington; Sep. 30, 2008; available at http://files.acco.com/KENSINGTON/K33442US/K33442US-usconsumer.pdf; retrieved May 12, 2009., 1 page.

Coldewey, Devin; "Combination iPhone battery pack and flash from FastMac," *CrunchGear*; Nov. 4, 2008; available at http://www.crunchgear.com/2008/11/04/combination-iphone-battery-pack-and-flash-from-fastmac/>; retrieved May 12, 2009; 3 pages.

Horwitz, Jeremy ; "iLuv i603/ i604 Rechargeable Lithium Polymer Batteries with Silicone Skin," iLounge; Jun. 27, 2006 available at http://www.ilounge.com/index.php/reviews/iluv-i603-rechargeable-lithium-polymer-battery-with-silicone-skin/>; retrieved May 12, 2009; 3 pages.

* cited by examiner

MODULAR MOBILE ACCESSORY FOR MOBILE DEVICE

RELATED APPLICATIONS

This application claims priority to a U.S. Provisional Patent Application Ser. No. 61/346,386 entitled "External Case Accessory for Mobile Devices Incorporating Payment Processing Device, TV Signal Receiver Device, and/or Modular Multi-Input/Output Device" filed May 19, 2010.

FIELD OF THE INVENTION

Aspects relate to accessories for mobile devices. More particularly embodiments include an external protective case and/or holster for mobile electronic devices, where the external protective case/holster incorporates a battery pack, a payment processing device, television signal receiver, and/or a modular multi-input/output device.

BACKGROUND

Many mobile devices (e.g., mobile phones, digital assistants, mobile communication devices, handheld computing devices, personal music/video/content players and storage devices) are often powered by battery power sources. Such battery power sources are often housed within the mobile device and may be changed and/or recharged as needed. However, as more powerful mobile devices are designed, these tend to consume power more quickly, thereby shortening the time between charges. This tends to limit the usefulness of the mobile device since the user must find a power source to recharge the battery source and wait until it is recharged.

Additionally, such mobile devices are typically designed to satisfy the needs of a wide array of consumers. For instance, such mobile devices may have somewhat limited processing capabilities (e.g., to extend battery power) and limited input/output capabilities. Consequently, users who wish to extend the capabilities of the mobile device to implement various types of solutions may be prevented from doing so.

DETAILED DESCRIPTION

In the following detailed description, numerous specific details are set forth in order to provide a thorough understanding of the invention. However, the invention may be practiced without these specific details. In other instances, well known methods, procedures, and/or components have not been described in detail so as not to unnecessarily obscure aspects of the invention.

First Embodiment of Battery Pack

Figure 1:
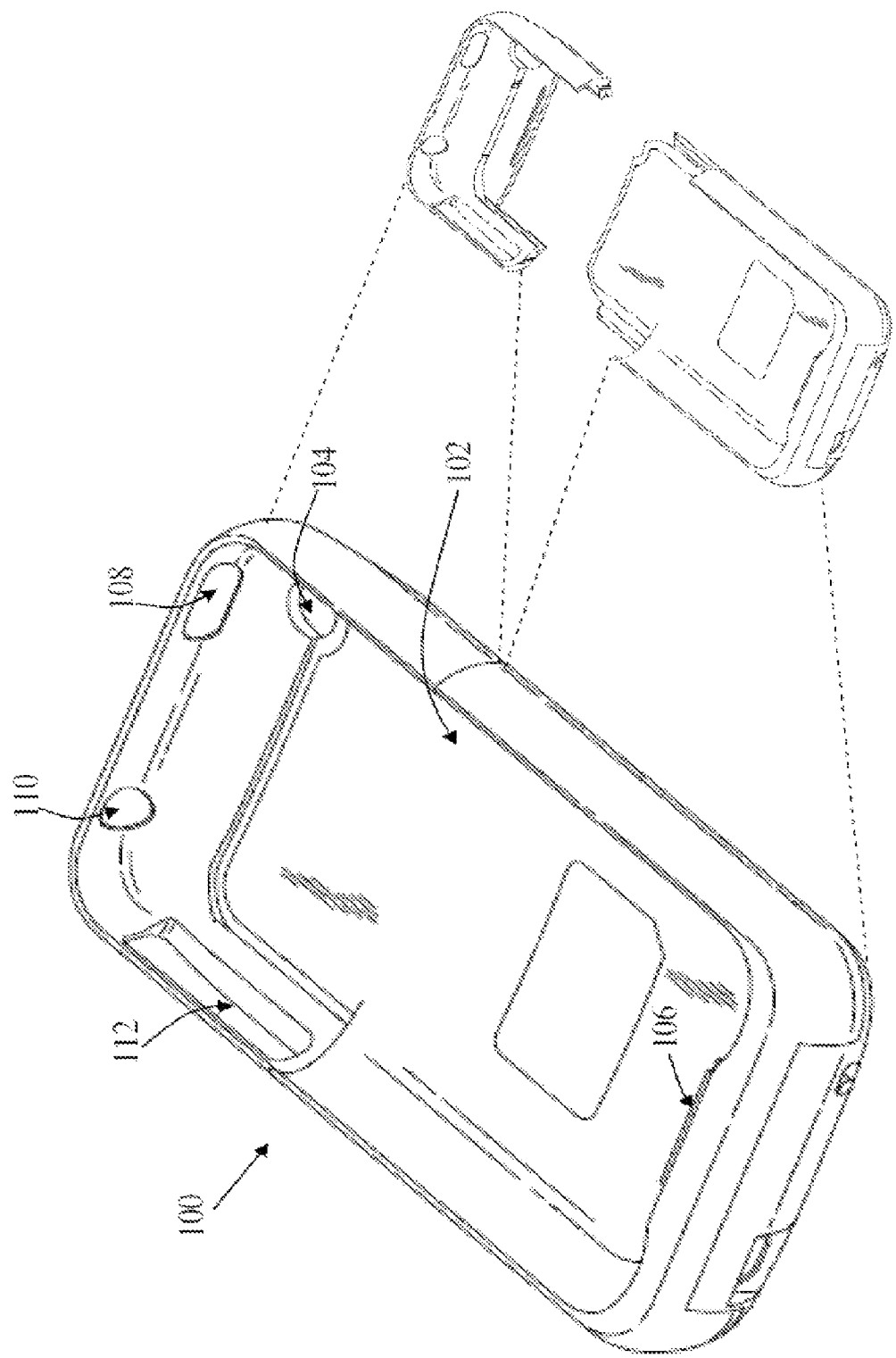
FIG. 1 illustrates a perspective view of a battery pack for a mobile device according to one example.

FIG. 1 illustrates a perspective view of a battery pack for a mobile device according to one example. In this example, the battery pack 100 is shaped to receive or house a mobile phone within a contoured cavity 102. The battery pack 100 has an integrated rechargeable power cell capable of providing power to operate and/or recharge a mobile device. For illustrative purposes, mobile device is depicted as an iPhone™ by Apple Inc.; it is understood by those familiar with the art that other mobile devices such as computers, mobile phones, media players, music players, personal digital assistants (PDAs), tablet computer, and the like may be equally applicable.

Figure 2:
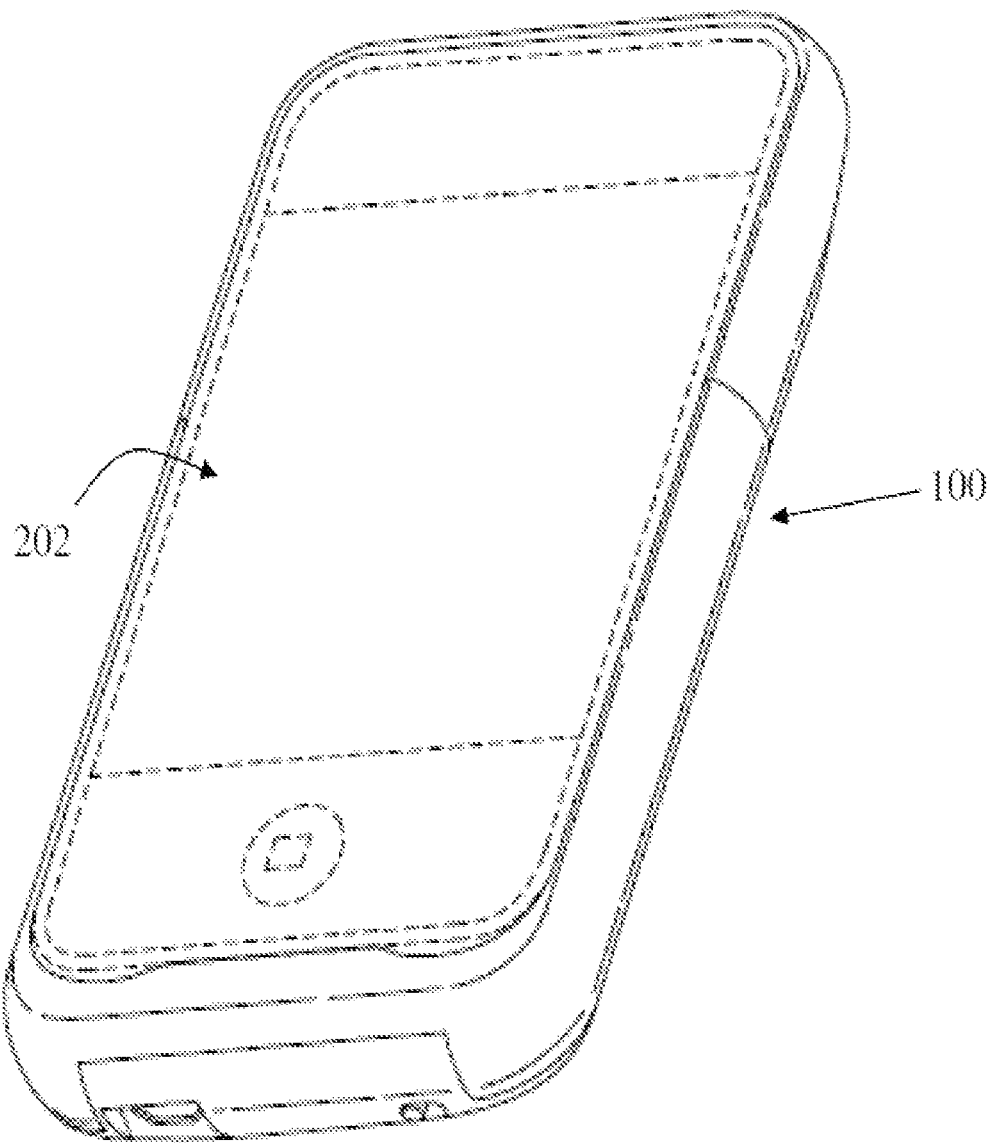
FIG. 2 illustrates how a mobile device can be housed within the battery pack of FIG. 1.

FIG. 2 illustrates how a mobile device can be housed within the battery pack 100 of FIG. 1. As can be appreciated from this figure, the battery pack 100 is shaped to closely wrap around the mobile device 202 and serves as a protective case for the mobile device 202.

Figure 3:
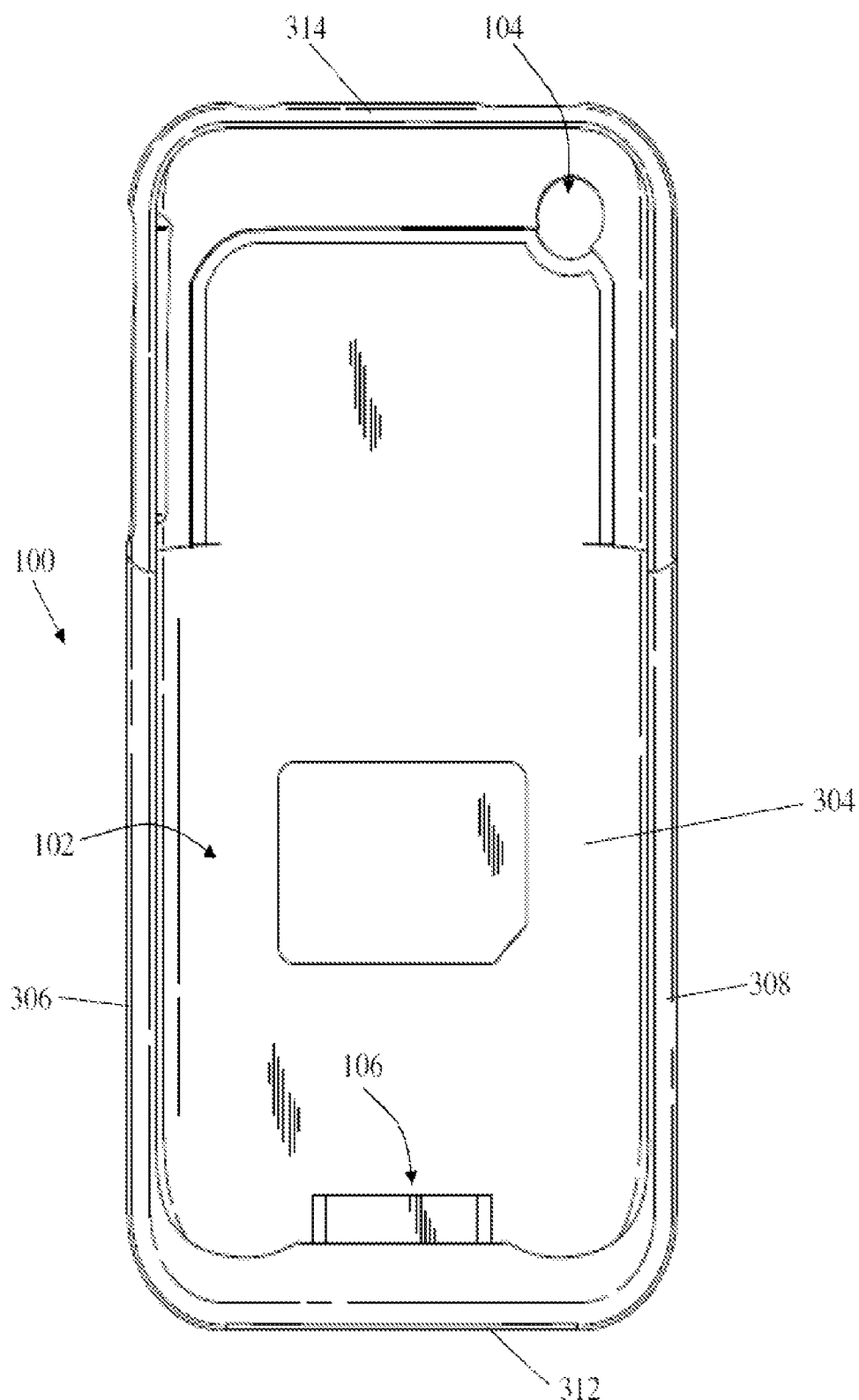
FIG. 3 illustrates a front view of the battery pack of FIG. 1.

FIG. 3 illustrates a front view of the battery pack 100 of FIG. 1. The battery pack 100 includes a backplane 304, first and second sides 306 and 308, a bottom side 312, and a top side 314. The backplane 304, first and second sides 306, bottom side 312 and top side 314 may be shaped to form a pocket or cavity 102 in which a mobile device 202 to be powered can be housed. The top side 314 of the battery pack 100 may slide out to allow insertion and removal of the mobile device 202.

Referring again to FIG. 1, the battery pack 100 may include one or more openings 104, 108, 110, and 112 to facilitate access to various features of the mobile device 202. It is understood that the placement of the openings is dependent on the type of mobile device. For instance, a first opening 104 on the back plane 304 of the battery pack 100 may allow unobstructed view for a camera lens on the back of the mobile device 202. A second opening 108 may provide access to a screen on/off switch for the mobile device 202. A third opening 110 may provide access to an audio jack on the mobile device 202. A fourth opening 112 on the first side 306 may provide access to a volume control sliding switch.

The battery pack 100 may also include a connector or interface 106 within the cavity 102 (e.g., on the bottom side 312) through which power can be provided to the mobile device 202 from the internal power cell of the battery pack 100. Additionally, the connector 106 may be coupled to an external interface to provide input and/or output signals to the mobile device 202.

From FIG. 1, it can be appreciated that the battery pack may include two sections that separate to allow insertion of the mobile device 202 and can then be coupled together to secure the mobile device 202 in place. The size and shape of the battery pack 100 may be approximately that of the external contour of a mobile device 202 to which it is intended to provide power.

Figure 4:
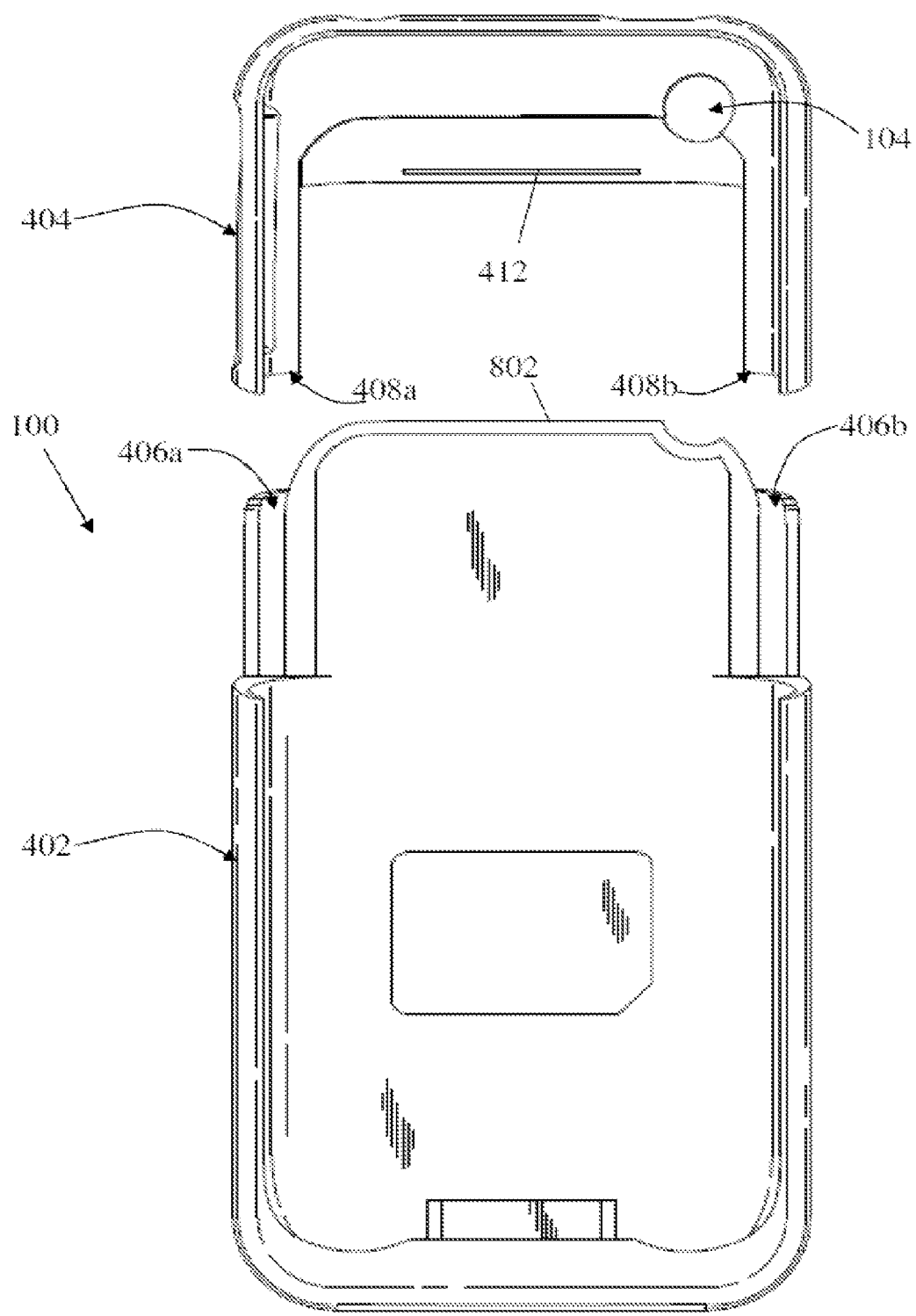
FIG. 4 illustrates the battery pack of FIG. 1 in an open configuration.

FIG. 4 illustrates the battery pack of FIG. 1 in an open configuration. The battery pack 100 may include a bottom section 402 and a top section 404 that can be separated from each other to insert a mobile device 202 within the battery pack 100 and can them be coupled together secure the mobile device 202 in place. For example, the bottom section 402 may include receiving grooves 406a and 406b that receive rails 408a and 408b from the top section 404. In this manner, the top section 404 can be coupled to the bottom section 402 by pressure fit. For example, a tongue section 802 (FIG. 8) may slide on to the top section 404 such that an engaging tab 412 couples into a receiving groove 804 (FIG. 8) to secure the top section 404 to the bottom section 402.

Figure 5:
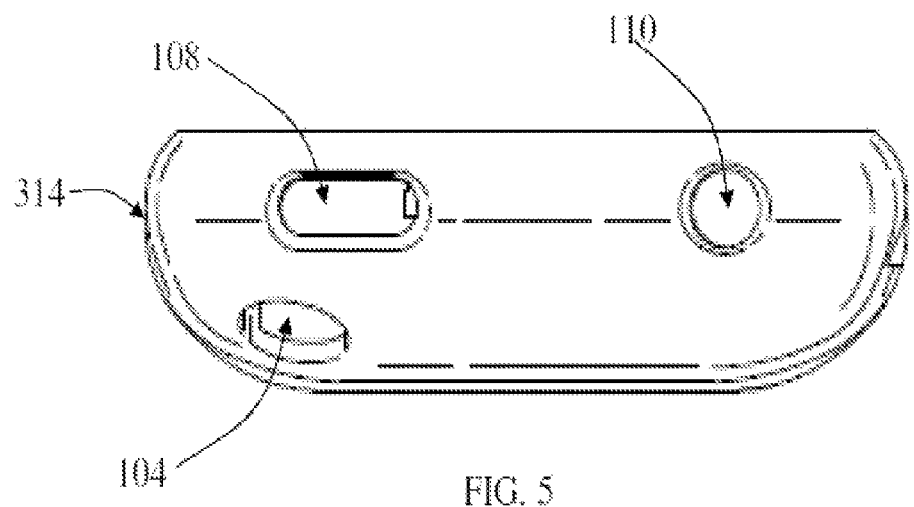
FIG. 5 illustrates a top view of the battery pack of FIG. 1.

FIG. 5 illustrates a top view of the battery pack 100 of FIG. 1. In this view, the top side 314 of the battery pack 100 is shown and the first opening 104, second opening 108, and third opening 110 can be appreciated.

Figure 6:
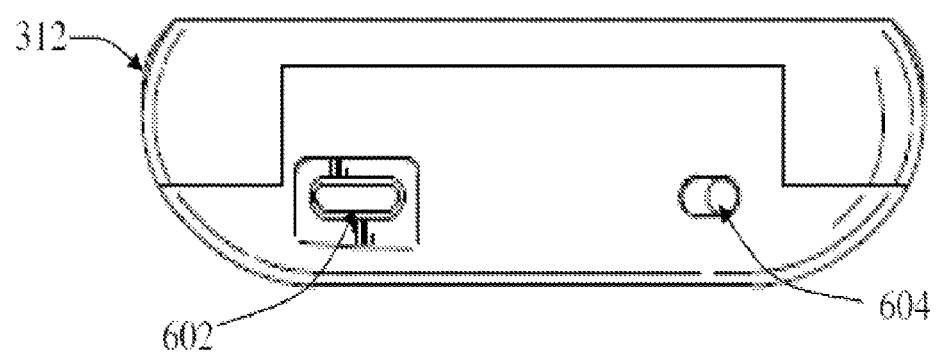
FIG. 6 illustrates a bottom view of the battery pack of FIG. 1.

FIG. 6 illustrates a bottom view of the battery pack 100 of FIG. 1. In this view, the bottom side 312 of the battery pack 100 is shown. In this view, an external interface 602 (e.g., micro USB connector) is shown. This external interface 602 may serve to recharge the internal power cell of the battery pack. Additionally, the external interface 602 may also provide a pass-through signaling interface for the internal connector or interface 106, thereby allowing the mobile device 202 to communicate via the external interface 602. A switch 604 may also be located on the bottom side 312 of the battery pack and can function to switch power from the battery pack On or Off. That is, when the mobile device 202 has sufficient power on its own, the power cell of the battery pack is not needed and can be switched Off until it is needed.

Figure 7:
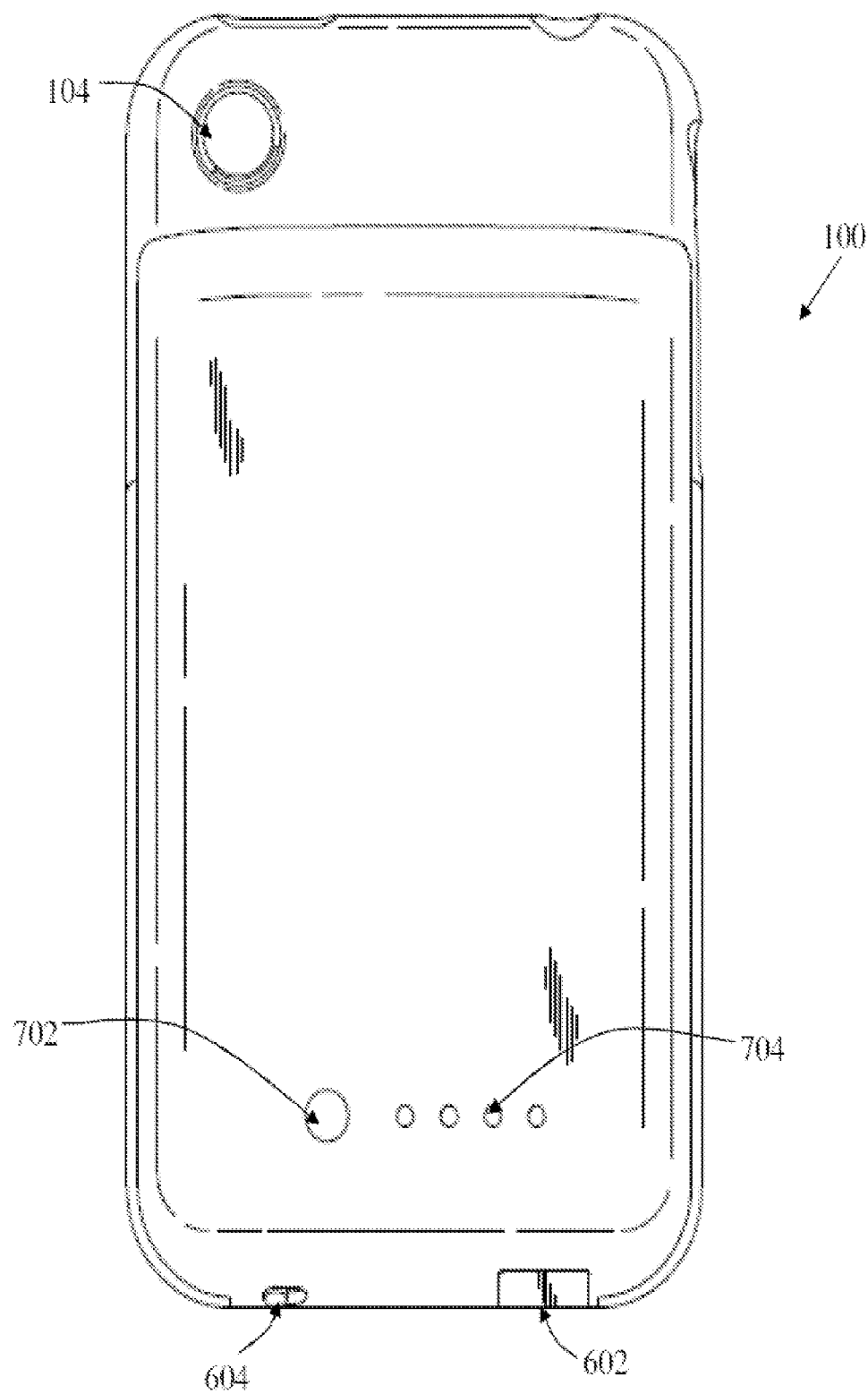
FIG. 7 illustrates a back view of the battery pack of FIG. 1.

FIG. 7 illustrates a back view of the battery pack 100 of FIG. 1. In this example, a test button 702 is provided that, when pushed, causes plurality of LED lights 704 to indicate the power or charge level of the internal power cell of the battery pack 100.

Figure 8:
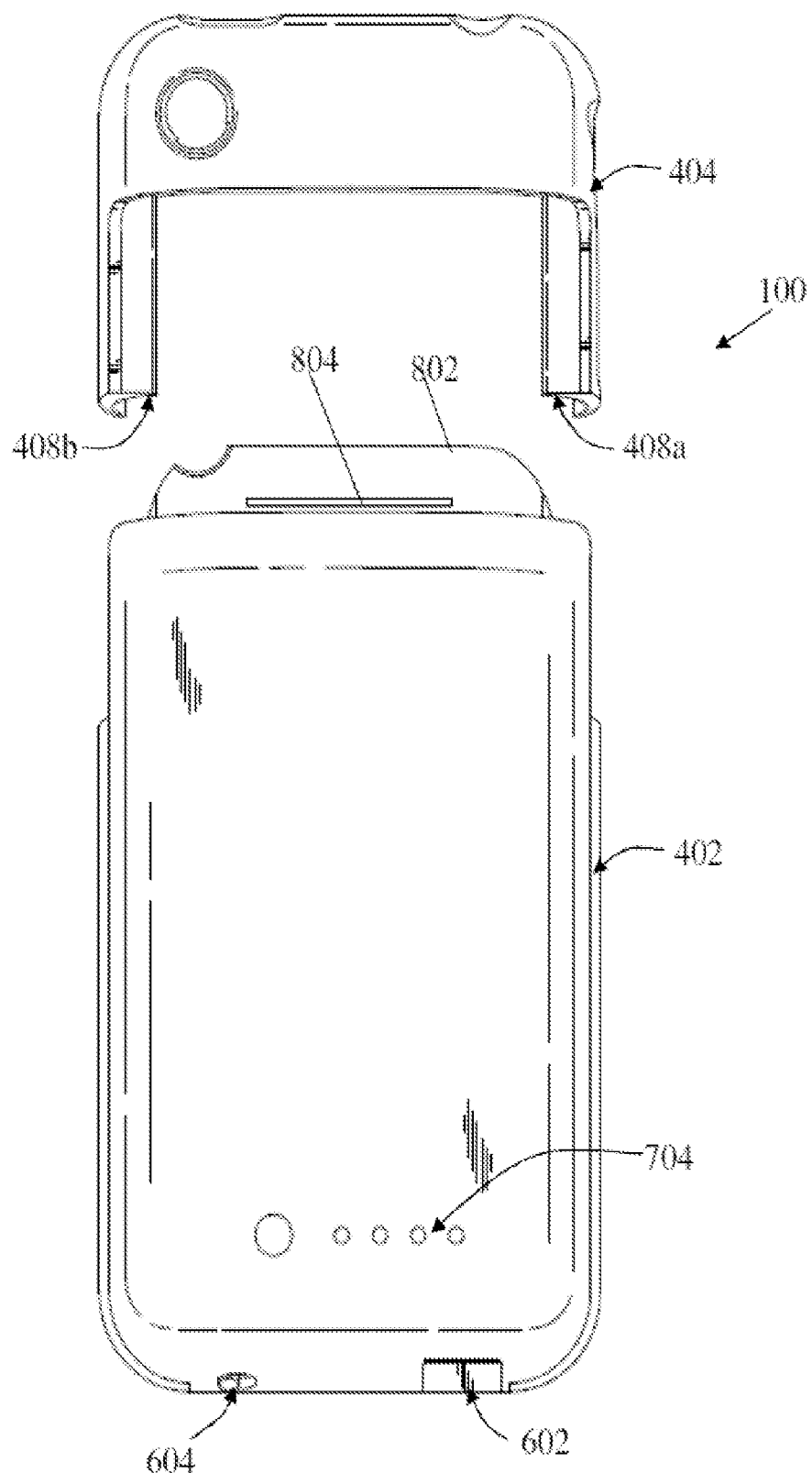
FIG. 8 illustrates back view of the battery pack of FIG. 1 in an open position.

FIG. 8 illustrates back view of the battery pack 100 of FIG. 1 in an open position.

Figure 9:
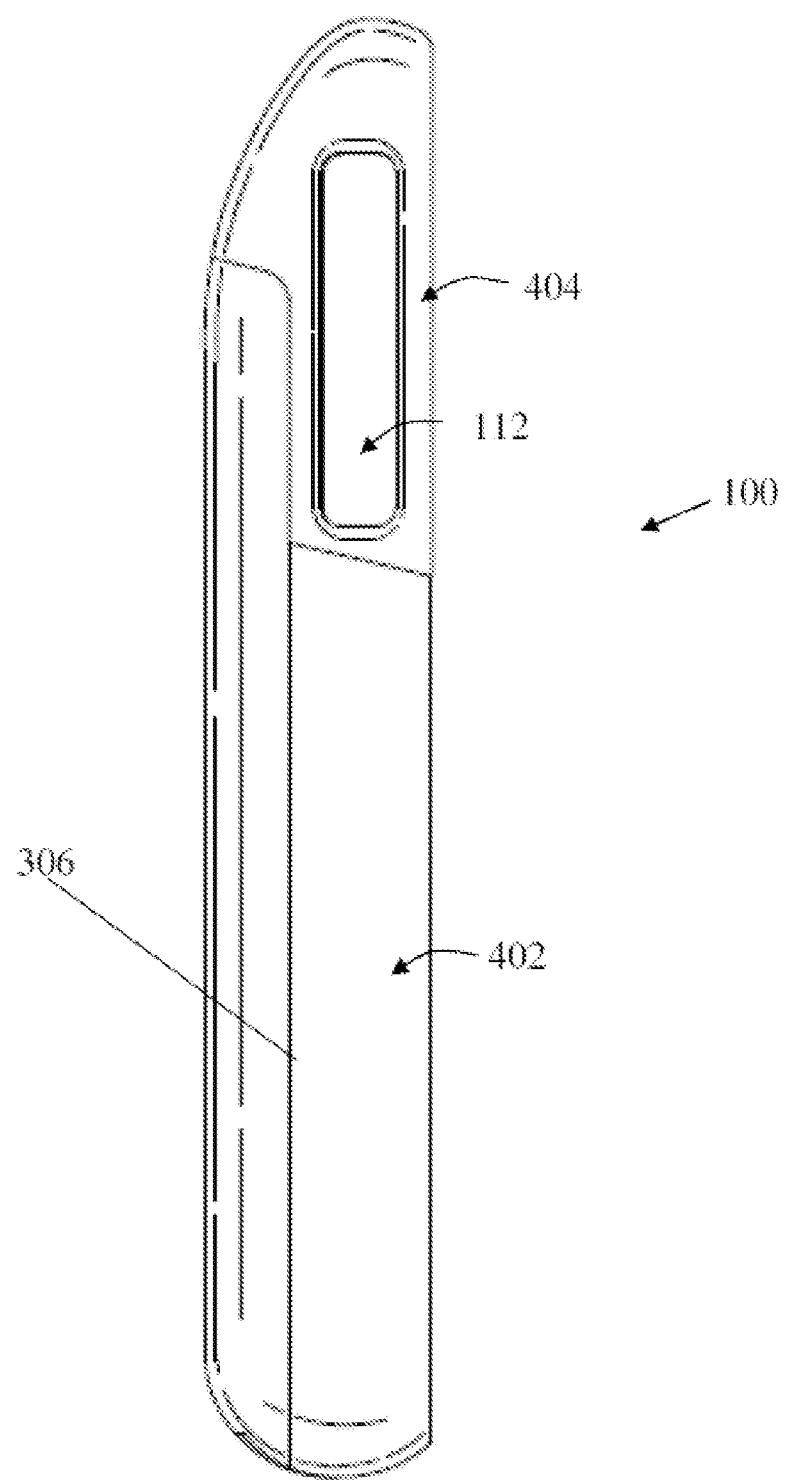
FIG. 9 illustrates a first side view of the battery pack of FIG. 1.

FIG. 9 illustrates a first side view of the battery pack of FIG. 1.

Figure 10:
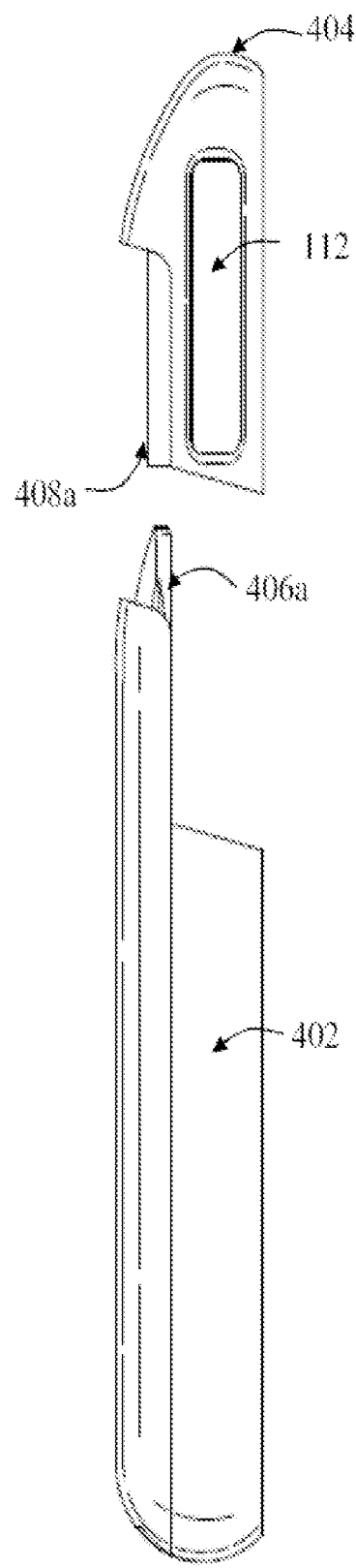
FIG. 10 illustrates the first side view of the battery pack of FIG. 1 in an open position.

FIG. 10 illustrates the first side view of the battery pack of FIG. 1 in an open position.

Figure 11:
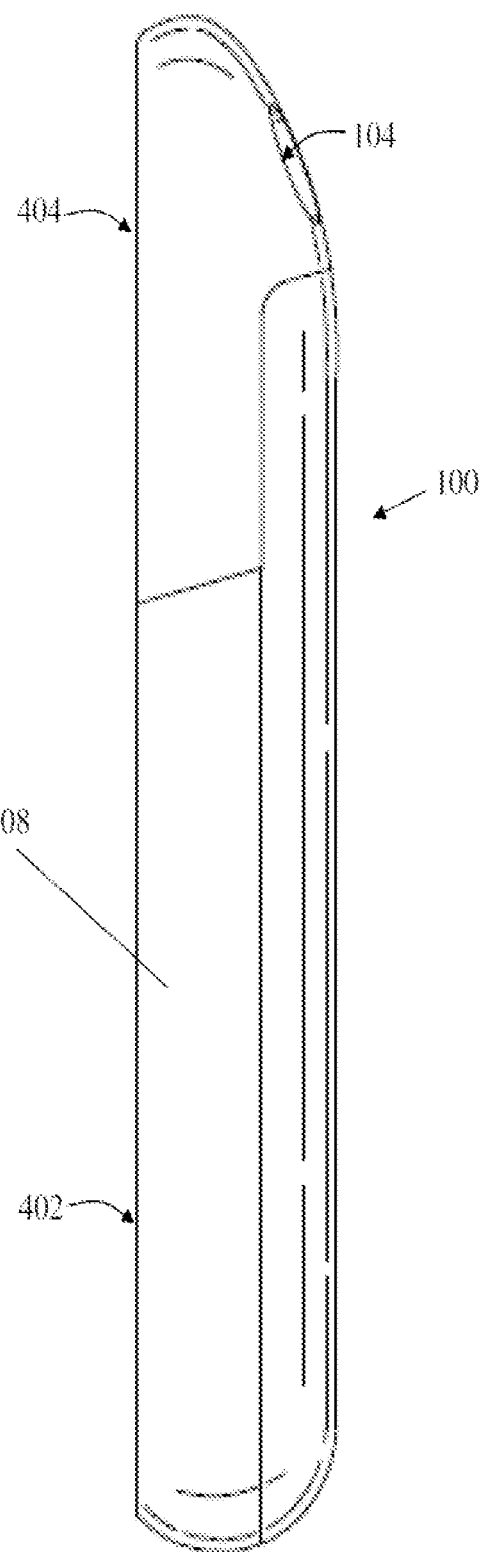
FIG. 11 illustrates a second side view of the battery pack of FIG. 1.

FIG. 11 illustrates a second side view of the battery pack of FIG. 1.

Figure 12:
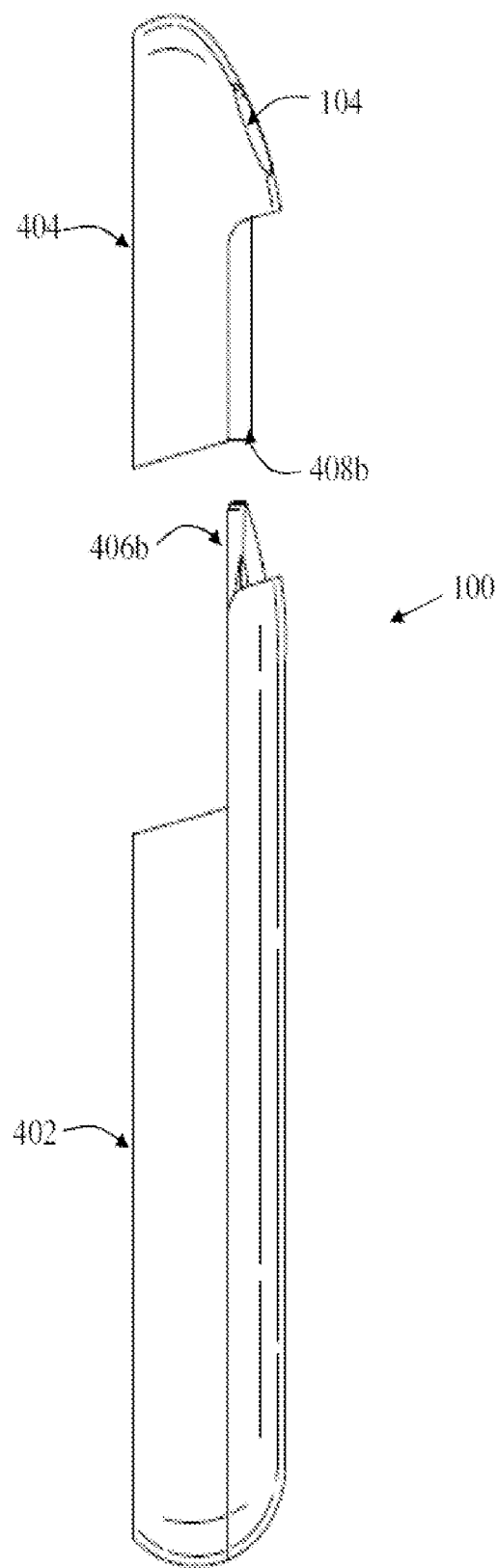
FIG. 12 illustrates the second side view of the battery pack of FIG. 1 in an open position.

FIG. 12 illustrates the second side view of the battery pack of FIG. 1 in an open position.

Figure 13:
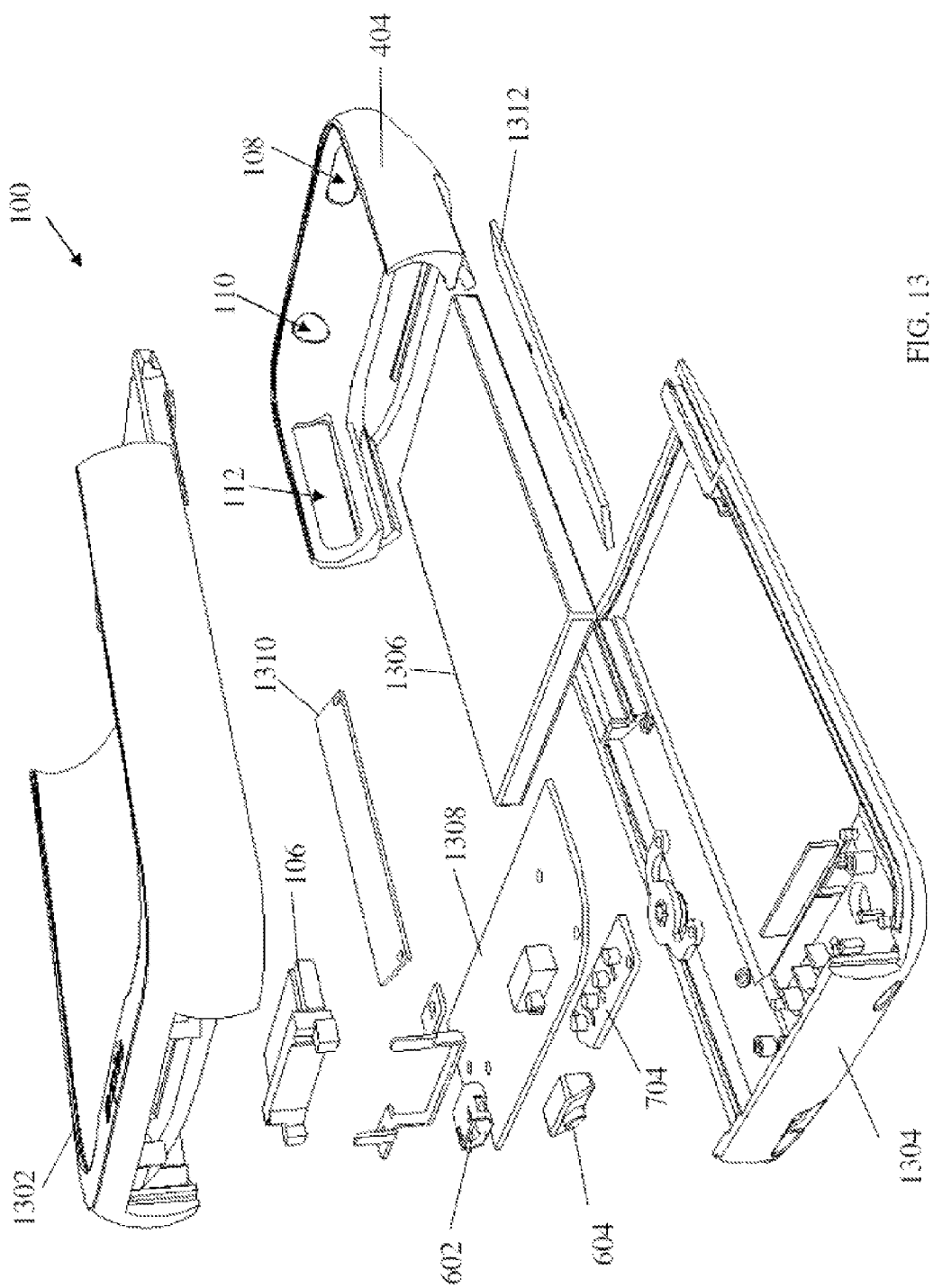
FIG. 13 is an exploded view of components of the battery pack of FIG. 1.

FIG. 13 is an exploded view of components of the battery pack of FIG. 1. In this example, the battery pack may include a first bottom section 1302 and a second bottom section 1304 which form a top and bottom shell in between which one or more circuit boards 1308, 1310, and/or 1312 and/or one or more power cells 1306 are housed. That is, the circuits boards 1308, 1310, 1312 and/or power cell(s) 1306 are sandwiched between the top and bottom sections 1302 and 1304 of the battery pack 100. Consequently, the rechargeable power cell(s) 1306 may be housed within the thickness of the back plane of the battery pack.

In some instance, the circuit boards and or power cell of the battery pack may cause interference with the antenna or signaling of the mobile device 202 which is in close proximity. Consequently, one aspect provides for reducing the size of a primary circuit board 1308 by adding secondary circuit boards 1310 and 1312 which are electrically coupled to the primary circuit board 1308. This allows reducing the size of the circuit board 1308 thereby reducing interference to the antenna of the mobile device 202. Additionally, the ground for the power cell 1306 may be coupled to the ground for the mobile device 202 (via the internal interface 106) to reduce interference to the mobile device 202.

Figure 14:
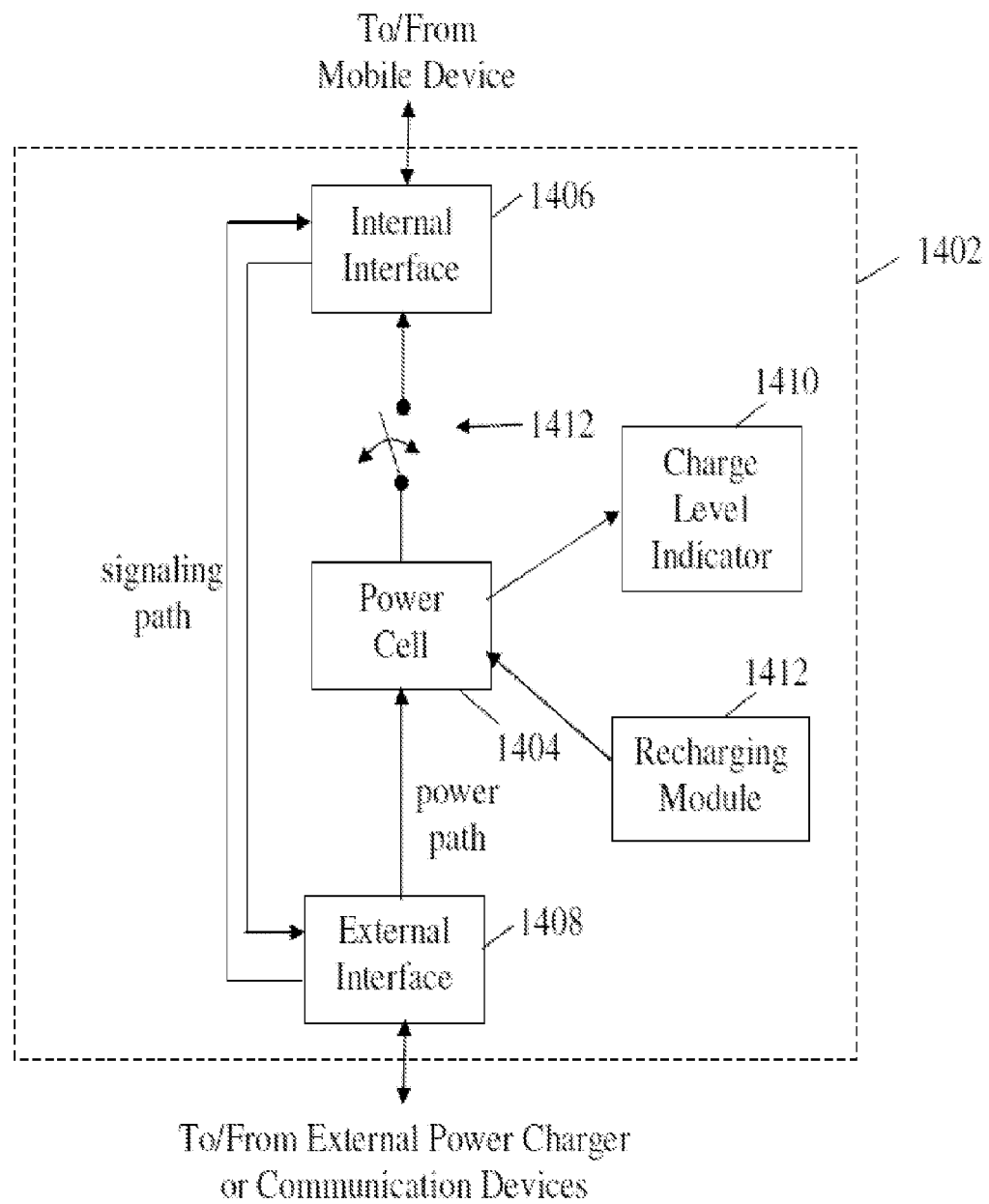
FIG. 14 illustrates a block diagram for the battery pack of FIG. 1.

FIG. 14 illustrates a block diagram for the battery pack 100 of FIG. 1. The battery pack 1402 may include a power cell 1404, an internal interface 1406, an external interface 1408, and charge level indicator 1410. The internal interface 1406 may be adapted to provide a mobile device 202 power from the power cell 1404 as well as passing signal to/from the mobile device 202 to the external interface 1408. The external interface 1408 may allow recharging of the power cell 1404 as well as passing signals to/from the mobile device 202 via the internal interface 1406. A switch 1412 may allow switching power from the power cell 1404 to the mobile device 2020n and Off as desired. Also, a charge level indicator 1410 permits displaying of the charge level of the power cell 1404. Additionally, a recharging module 1412 serves to recharge to power cell 1404 when needed.

Second Embodiment of Battery Pack

FIGS. 15-16 and 18-22 illustrate yet another embodiment of the power pack. In this embodiment, the power pack may operate as previously disclosed but does not include a top section. By removing the top section, the battery pack is more compact in size and ergonomic so that it does not significantly increase or change the size, thickness, and/or shape of mobile communication device 1602 secured thereto.

Figure 15:
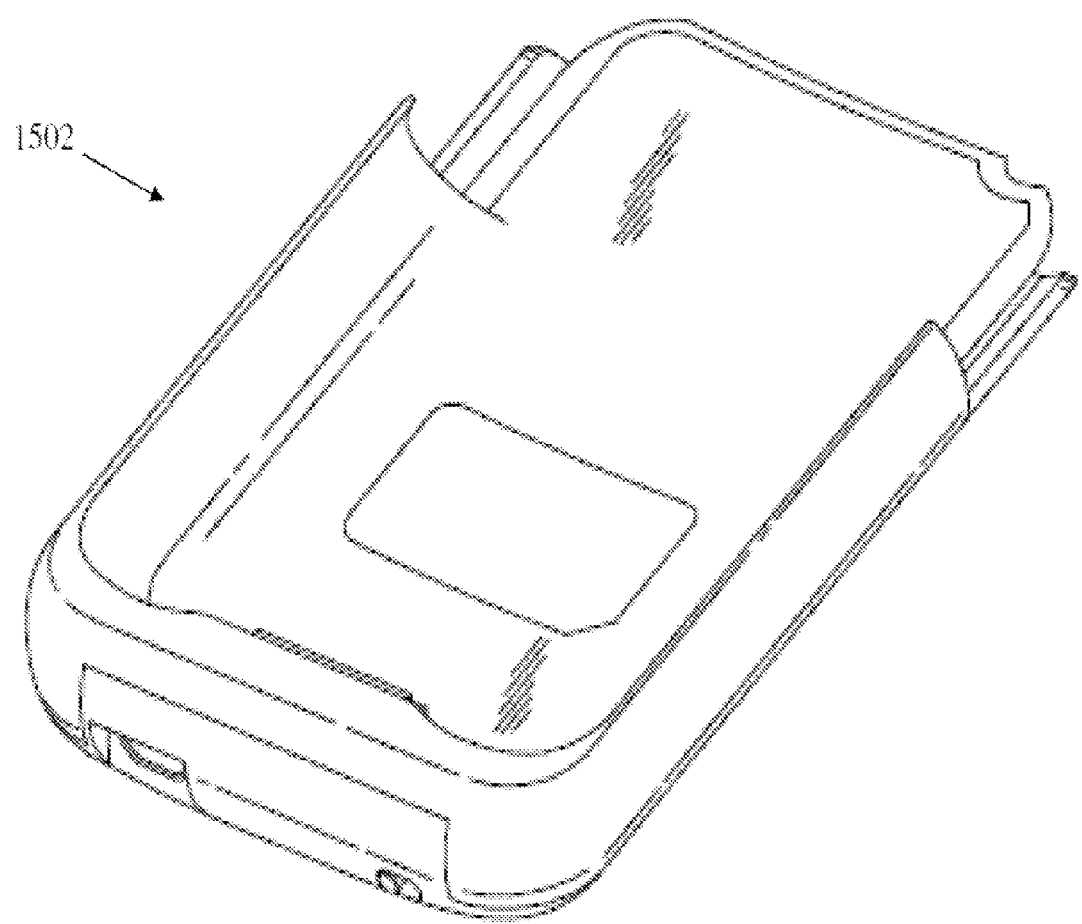
FIG. 15 illustrates a perspective view of the battery pack.

FIG. 15 illustrates a perspective view of the battery pack 1502.

Figure 16:
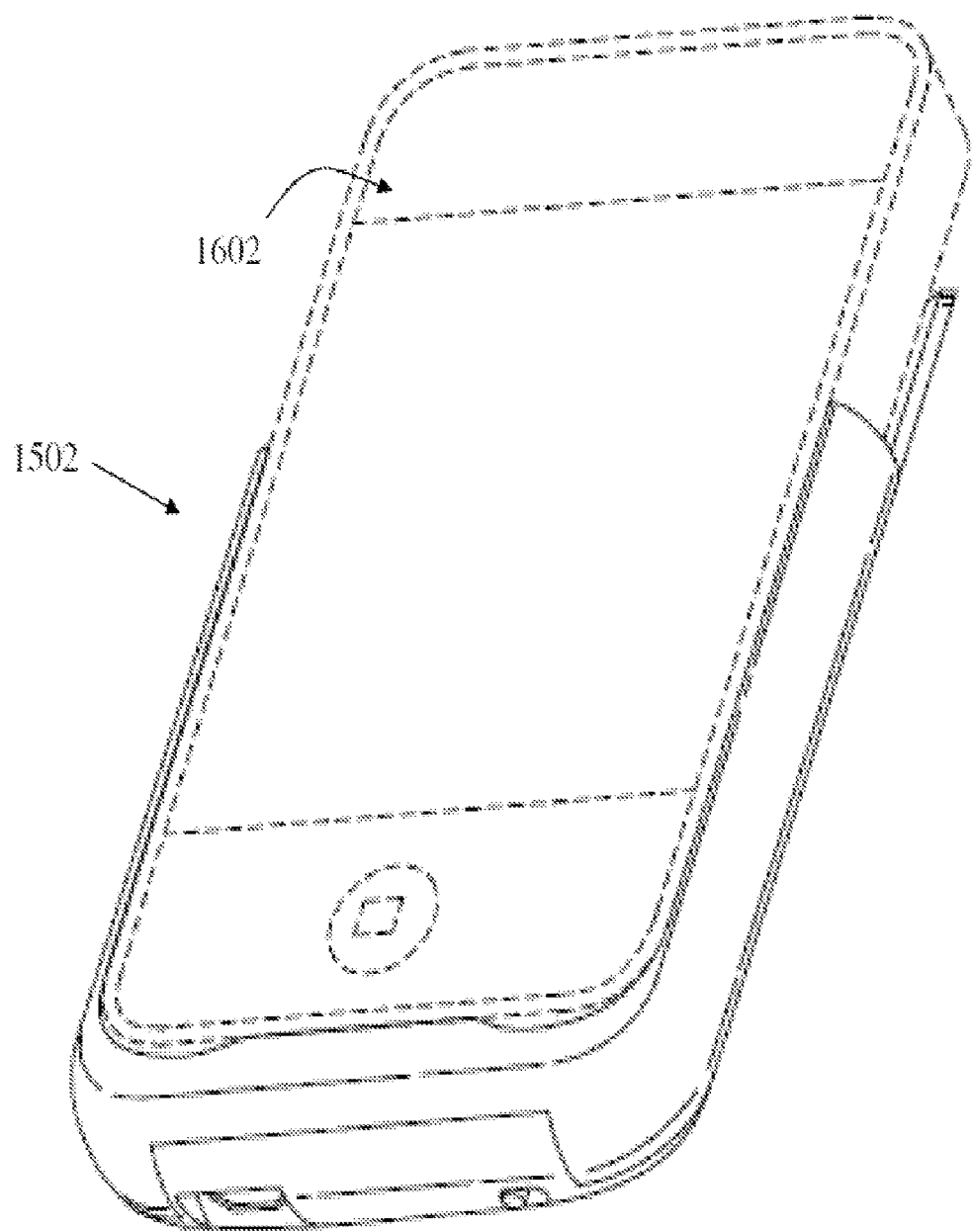
FIG. 16 illustrates a perspective view of the battery pack with a mobile device 1602 inserted therein.

FIG. 16 illustrates a perspective view of the battery pack 1502 with a mobile device 1602 inserted therein.

Figure 18:
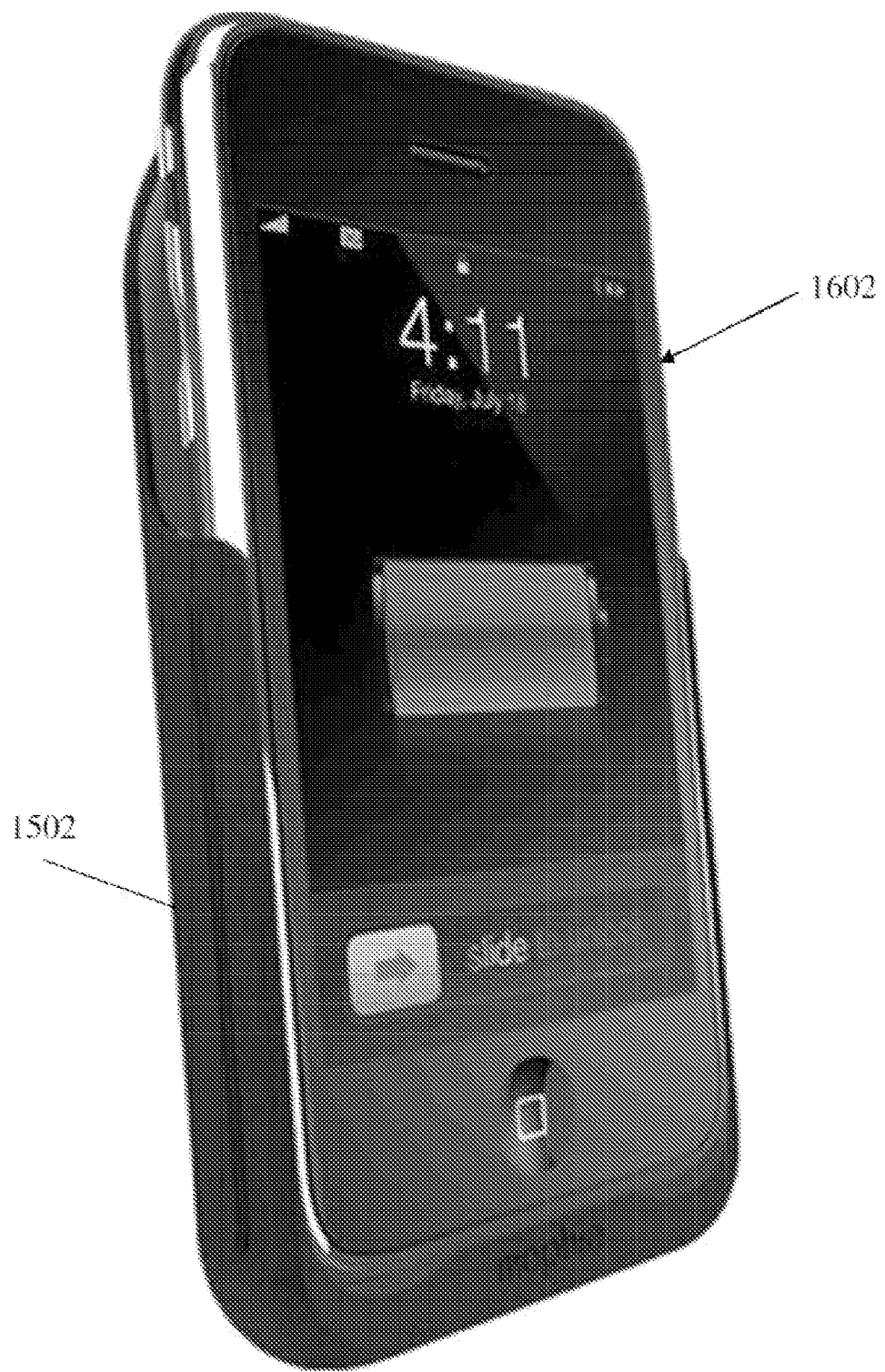
FIG. 18 illustrates another perspective view of the battery pack.

FIG. 18 illustrates another perspective view of the battery pack 1502.

Figure 19:
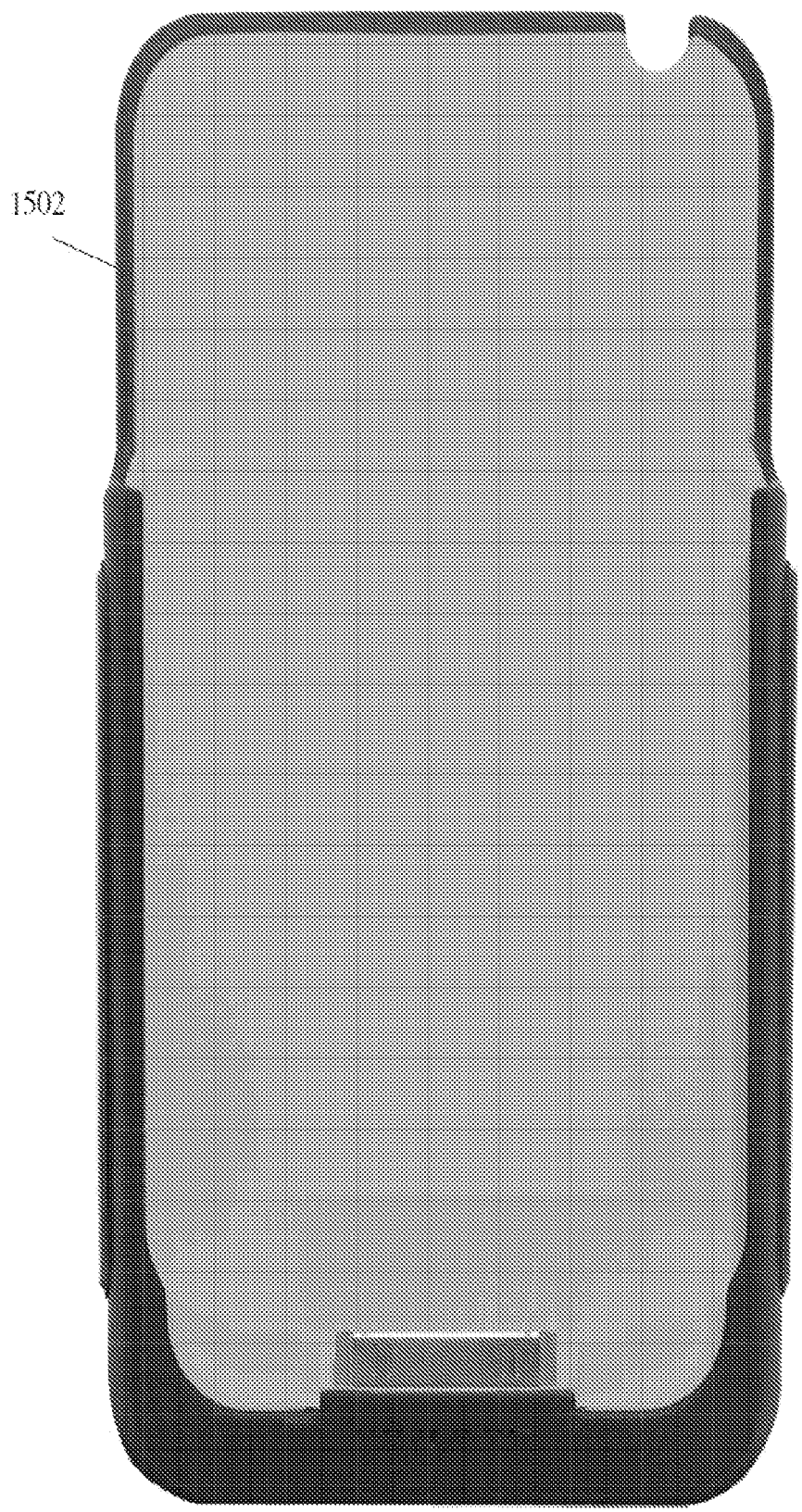
FIG. 19 illustrates a front view of the battery pack.

FIG. 19 illustrates a front view of the battery pack 1502.

Figure 20:
FIG. 20 illustrates a front view of the battery pack 1502 with the mobile device inserted therein.

FIG. 20 illustrates a front view of the battery pack 1502 with the mobile device inserted therein.

Figure 21:
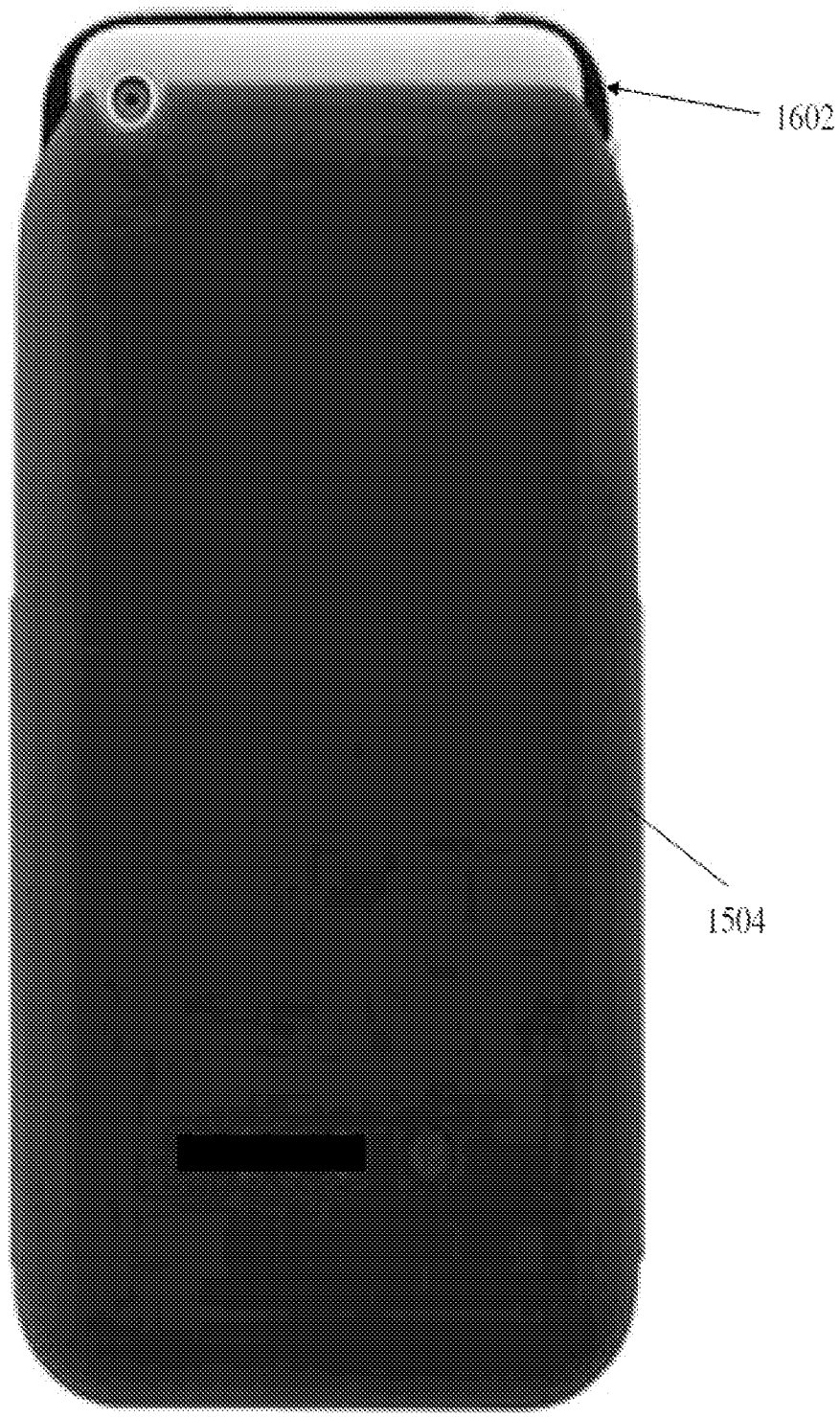
FIG. 21 illustrates a back view of the battery pack with the mobile device inserted therein.

FIG. 21 illustrates a back view of the battery pack 1502 with the mobile device 1602 inserted therein.

Figure 22:
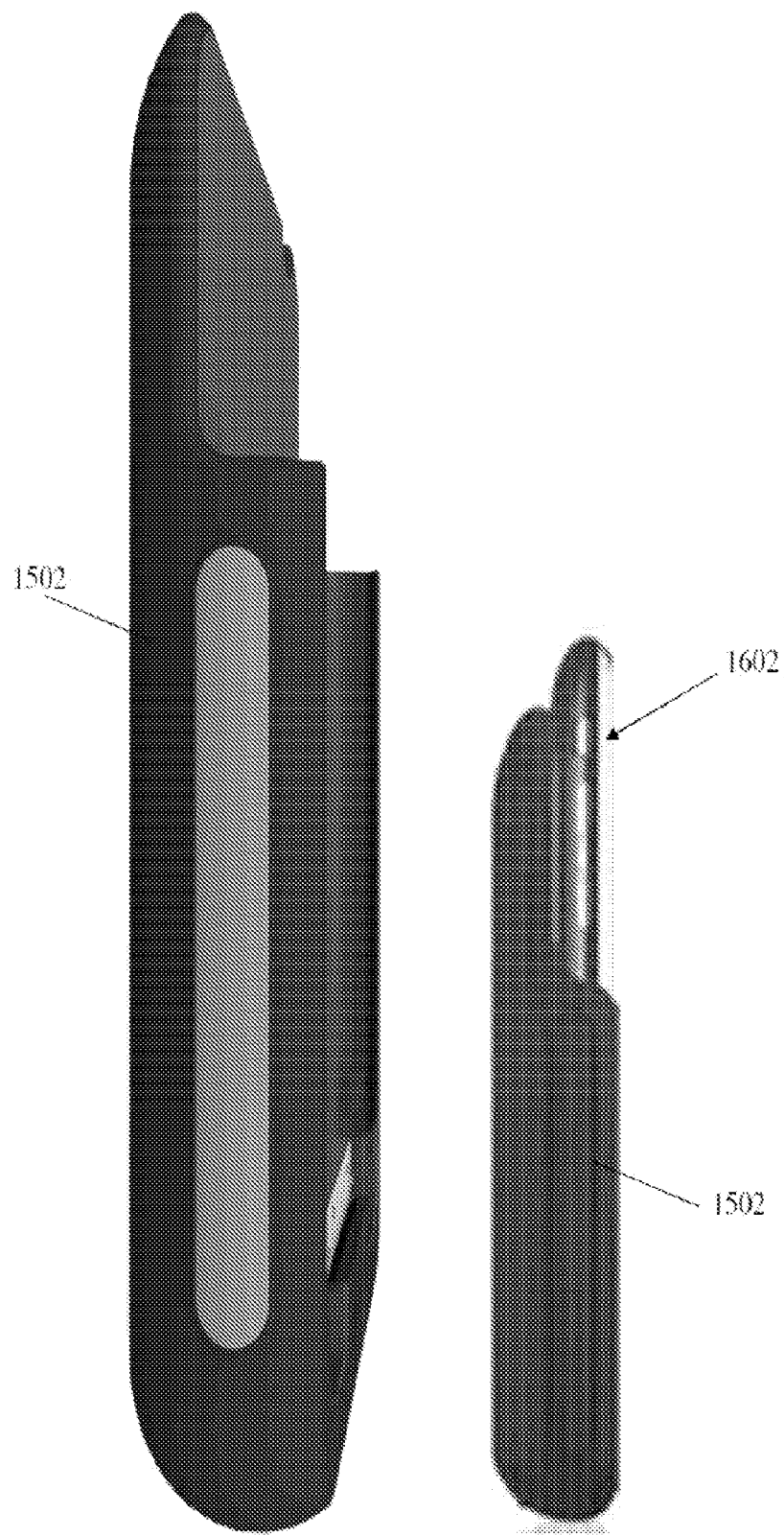
FIG. 22 illustrates a side view of the battery pack with and without the mobile device.

FIG. 22 illustrates a side view of the battery pack 1502 with and without the mobile device 1602. Note that, in some embodiments, the left and right sides may be symmetrical.

Extendible Processing and Interfacing Platform

Figure 17:
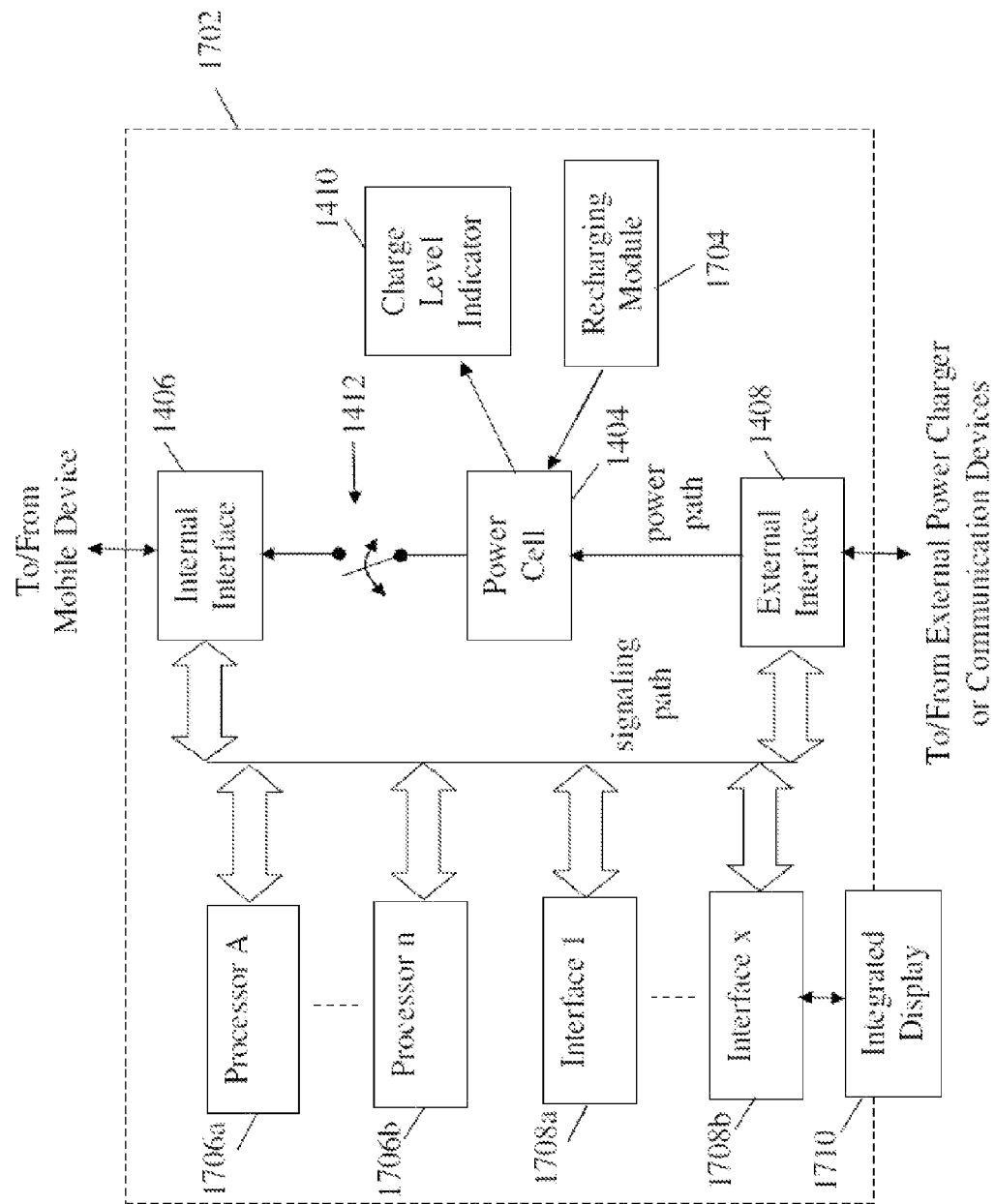
FIG. 17 illustrates a battery pack that also operates as an extendible processing and/or interfacing platform for a mobile device

FIG. 17 illustrates a battery pack that also operates as an extendible processing and/or interfacing platform for a mobile device. In one example, the battery pack 1702 may operate as described with reference to FIG. 14. In addition, the battery pack may also include one or more processors 1706 and/or one or more interfaces 1708. The one or more processors 1706a and 1706b may allow a mobile device coupled to the internal interface 1406 to extend its processing capabilities. For instance, the mobile device may cause one or more applications to be executed on the one or more processors 1706 while using a user display on the mobile device as an output interface. Additionally, the processors 1706a and/or 1706b may be purpose-specific processors that allow the mobile device to perform particular tasks not otherwise possible on its own. For example, the processors 1706 may provide analog-to-digital conversion, audio signal sampling, temperature measuring, etc., which may not be available to the standard mobile device.

The one or more interfaces 1708a and 1708b may also provide the mobile device a means by which to communicate or acquire signals. These interfaces 1708 may effectively expand the communication interfaces available to the mobile device by providing wired and/or wireless communication interfaces for various types of signals (e.g., audio, infrared, etc.). In this manner, the The battery pack 1702 may also include a recharging module 1704 that facilitates recharging of the power cell 1404. For example, the recharging module 1704 may be a wireless or cordless charging device that inductively or otherwise facilitates recharging of the power cell 1404.

In one example implementation, the battery pack 1702 may be adapted to function as a Medical Processing Unit which may have build-in capabilities for monitoring real-time health conditions (e.g., alcohol levels in breath, pulse, temperature, blood pressure, test and/or diagnose diabetes, etc.) via build-in test port. Consequently, the battery pack 1702 can collect and/or process such collected data and store it in the mobile device. Note that the processing of such data may be directed by an application that operates either on the one or more processors of the battery pack 1702 and/or the processor(s) of the mobile device. According to one feature, if an abnormal health condition occurs (e.g., a heart attack, fainting, seizure, etc.), the Medical Processing Unit may detect this condition and automatically activate the mobile device (e.g., cellular phone) to send urgent text message or emails to a doctor, hospital, or emergency responder. The responding party (doctor, hospital, emergency responder) may be able to locate the patient via a global positioning system or information from the mobile device.

In another example implementation, the battery pack 1702 may be adapted to function as a Gaming Processing Unit that may include the capability of turning the mobile device into a real handheld gaming device with joysticks or large PSP/DS type of gaming buttons and communication devices. Consequently, the mobile device may be configured to operate as an input and/or output interface (e.g., via a display on the mobile device or battery pack) for a game.

In yet another example, the battery pack 1702 may be adapted to function as a Home Entertainment Unit that may include the capability of turning the mobile device into a Universal Smart Remote Control which can control all the IR activated units in a home or office (e.g., control garage doors, television sets, security alarm, air conditioning, lighting, etc.). For this purpose, the battery pack 1702 may include various interfaces 1708 that provide the specific infrared and/or wireless protocols and/or signaling to control such devices, External Processing Mobile Accessory As discussed above, in reference to FIG. 17, the battery pack 1702 may operate as an extendible processing unit that comprises one or more processors 1706a and 1706b, and one or more interfaces 1708a and 1708b. The one or more processors 1706a and 1706b may allow a mobile device coupled to the internal interface 1406 to extend its processing capabilities, while the one or more interfaces 1708a and 1708b may also provide the mobile device a means by which to communicate or acquire signals. This concept may be extended to an external accessory that may include one or more processors and/or devices (with or without the external battery) that extend the functionality of, or add capabilities to, the mobile device.

Figure 23:
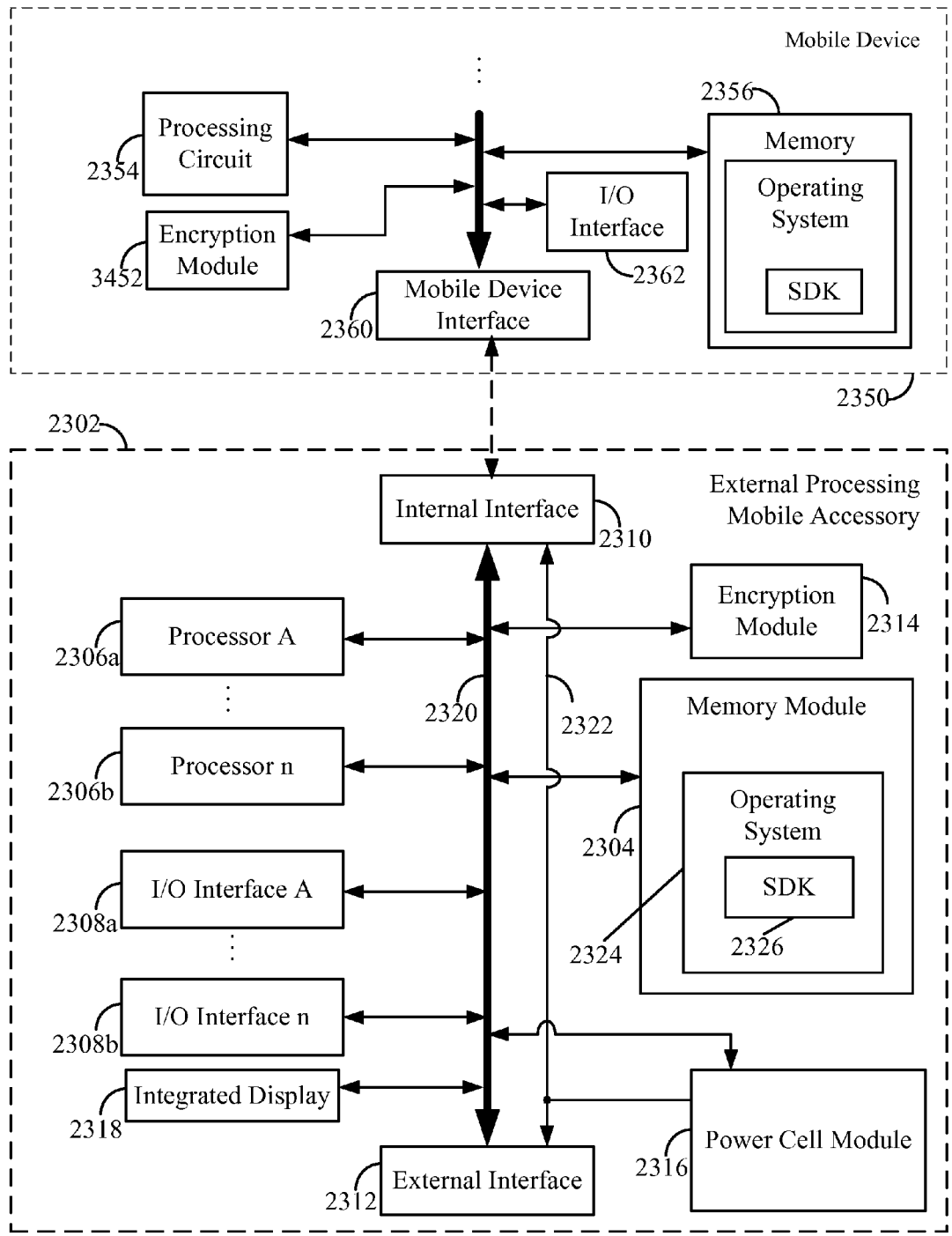
FIG. 23 illustrates a functional block diagram of an external processing mobile accessory that is adapted to provide additional external processing and additional interfaces for the mobile device.

For example, FIG. 23 illustrates a functional block diagram of an external processing mobile accessory 2302 that is adapted to provide additional external processing and additional interfaces for the mobile device 2350. The mobile processing accessory 2302 may comprise a memory module 2304, one or more processors 2306a and 2306b, one or more input and output (I/O) interfaces 2308a and 2308b, an internal interface 2310, an external interface 2312, an encryption module 2314, a power cell module 2316 (e.g., battery power source), an integrated display 2318, a bus 2320, and/or a power bus 2322. The bus 2320 serves as a communication interface between the one or more processors 2306a and 2306b, the one or more I/O interfaces 2308a and 2308b, the memory module 2304, the internal interface 2310, the external interface 2312, the encryption module 2314, the power cell module 2316, and/or integrated display 2318.

The power cell module 2316 is an optional module that may comprise the power cell 1404, charge level indicator 1410, recharging module 1704, and switch 1412 of FIG. 17. The power cell module 2316 and its components may perform some or all of the functions of the battery pack described in FIGS. 1-22. For example, the power cell module 2316 may provide power to the mobile device 2350 through the internal interface 2310 via the power bus 2322.

The memory module 2304 may comprise a volatile and/or non-volatile storage devices for storing an operating system 2324, software applications, and/or data. For instance, the memory module may include one or more software development kits (SDK) 2326. In one example, the memory module 2304 may comprise one or more independent computer data storage devices, such as, but not limited to, flash memory, ROM, RAM, hard disks, optical disks, solid-state memory such as flash memory, or any other computer data storage known in the art. The operating system (OS) 2324 can be any type of OS that adequately manages and coordinates the activities and sharing of the mobile processing accessory's 2302 resources, such as, but are not limited to, Android™, iPhone OS™, Symbian OS™, BlackBerry OS™, Windows Mobile™, Linux, Palm webOS™, and Maemo™. The OS 2324 may also host a variety of computing applications that are resident on memory module 2304.

The SDK 2326 may be a set of development tools that allows for the creation of applications (e.g., to be executed on the mobile device and/or a processor in the mobile accessory 2302) that communicate with the mobile processing accessory 2302. The SDK 2326 may comprise a simple application programming interface (API) in the form of data files resident on memory module 2304, and/or may include hardware that communicate with components within or outside the mobile processing accessory 2302. The SDK 2326 may include such tools as, but not limited to, a source code editor, a compiler, build automation tools, a debugger, and other utilities that may be presented in an integrated development environment (IDE). The SDK 2326 allows users to create a variety of unique applications that are executed on the one or more processors 2306a and 2306b (that may communicate with a corresponding application on the mobile device), and may also utilize the various types of resources available to a particular embodiment of the mobile processing accessory 2302.

The internal interface 2310 of the mobile processing accessory 2302 can transfer information to the mobile device 2350 by engaging with the mobile device interlace 2360 through a wire, bus, and/or electrical contact connection. Alternatively, or in addition to such a wired connection, the internal interface 2310 may transfer information to the mobile device 2350 wirelessly, using for example a Bluetooth standard, or any one of the 802.11 standards. In such a case, the mobile device 2350 may be equipped with appropriate wireless interface hardware that can receive and send information wirelessly.

The encryption module 2314 of the mobile processing accessory 2302 may serve to encrypt some or all data sent wirelessly or by wire from the internal interface 2310 to the mobile device interface 2360. The encryption module 2314 may also serve to decrypt any data received wirelessly or via wire by the internal interface 2310 to the mobile device interface 2360. The encryption module 2352 of the mobile device 2350 may also serve to encrypt any data sent wirelessly or by wire from the mobile device interface 2360 to the internal interface 2310. The encryption module 2352 may also serve to decrypt any data received wirelessly or via wire by the mobile device interface 2360 to the internal interface 2310. Various types of data encryption techniques may be utilized that are well known in the art including: symmetric-key cryptography such as Data Encryption Standard (DES), Advanced Encryption Standard (AES), hashing functions (MD5, SHA-1, SHA-2, SHA-3, etc.); and asymmetric-key cryptography such as digital signature schemes like the Rivest, Shamir and Adleman (RSA) algorithm and the Digital Signature Algorithm (DSA). The encryption modules 2314 and 2352 may be implemented using hardware circuitry, or software.

The various components discussed above with reference to mobile processing accessory 2302 may be removed, enhanced, and/or modified to create purpose-specific mobile accessories that interface with the mobile device 2350.

In some implementations, a version of the external processing mobile accessory 2302 may be sold or distributed as a programmable device that allows purchasers to add their own software applications and/or instructions to the memory module 2304. These applications may make use of the processing capabilities and/or input/output interfaces provided on the external processing mobile accessory 2302 to perform specialized tasks (e.g., collecting a person's vital signs, collecting finger prints, reading a credit card, etc.) which would not be possible, or easily implemented, on a mobile device with limited processing and/or interfacing resources. Thus, the external processing mobile accessory 2302 may serve as a platform for implementing purpose-specific applications.

Some embodiments of such purpose-specific mobile processing accessories will now be described in greater detail below.

Payment Processing Mobile Accessories
Magnetic Strip Card Reader Embodiment

Figure 24:
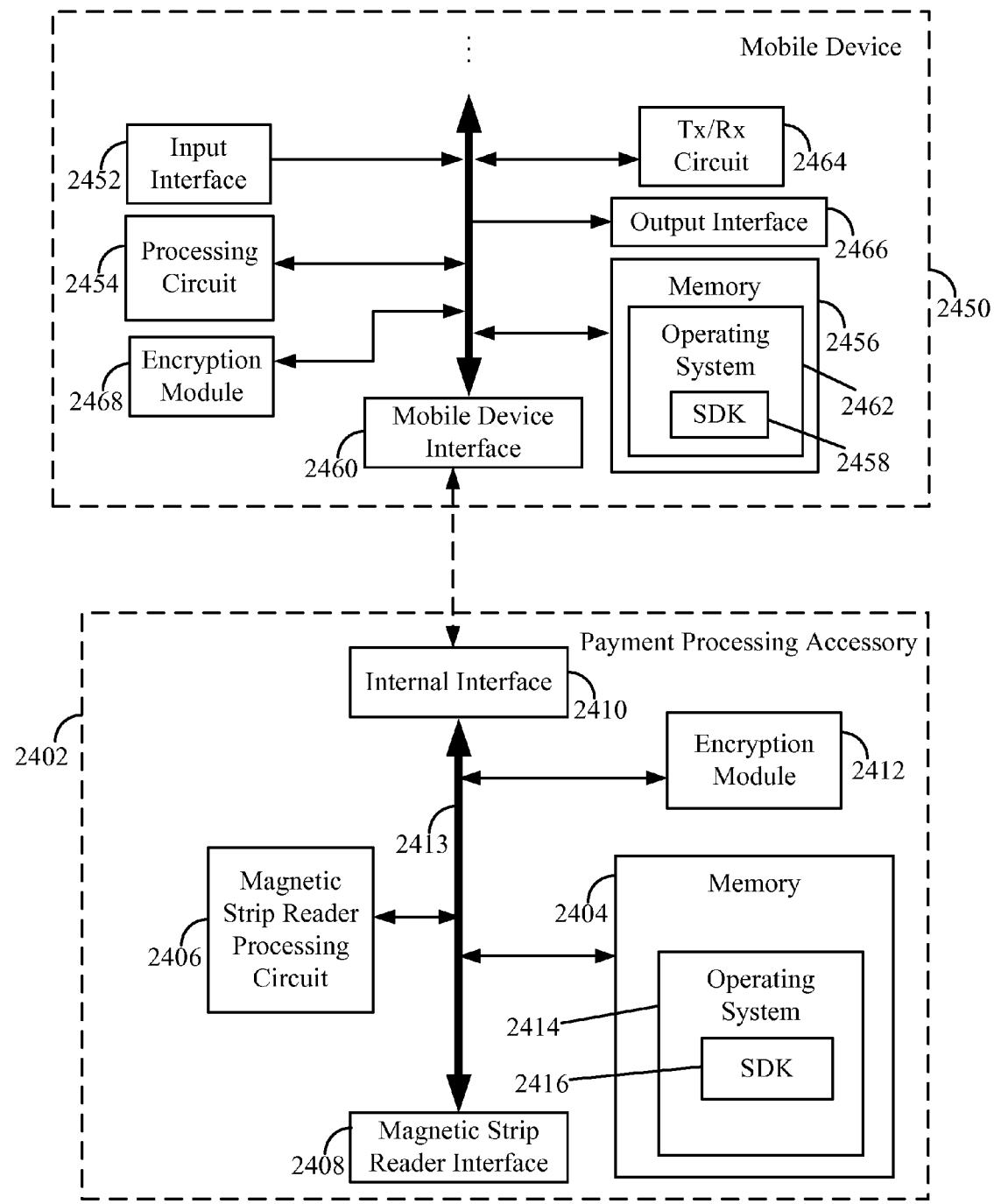
FIG. 24 illustrates a functional block diagram of one embodiment of a payment processing mobile accessory adapted to read data stored on magnetic strips of a payment card.

FIG. 24 illustrates a functional block diagram of one embodiment of a payment processing mobile accessory 2402 (also referred to as a "payment processing accessory 2402") adapted to read data stored on one or more magnetic strips associated with a payment card. The payment processing accessory 2402 may comprise a memory module 2404, a magnetic strip reader processing circuit 2406, a magnetic strip reader interface 2408, an internal interface 2410, an encryption module 2412, and a bus 2413. The bus 2413 allows for communication between the memory module 2404, the magnetic strip reader processing circuit 2406, the magnetic strip reader interface 2408, the internal interface 2410, and the encryption module 2412.

The memory module 2404 may comprise an operating system 2414, and one or more software development kits (SDK) 2416. The memory module 2404 may comprise one or more independent computer data storage devices, such as, but not limited to, flash memory, ROM, RAM, hard disks, optical disks, solid-state memory such as flash memory, or any other computer data storage known in the art. The operating system (OS) 2414 can be any type of OS that adequately manages and coordinates the activities and sharing of the payment processing accessory's 2402 resources, such as, but are not limited to, Android™, iPhone OS™, Symbian OS™, BlackBerry OS™, Windows Mobile™, Linux, Palm webOS™, and Maemo™. The OS 2414 may also host a variety of computing applications that are resident on memory module 2404.

The encryption module 2412 of the mobile processing accessory 2402 may also serve to encrypt any data sent wirelessly or by wire from the internal interface 2410 to the mobile device interface 2460. The encryption module 2412 may also serve to decrypt any data received wirelessly or via wire by the internal interface 2410 to the mobile device interface 2460. The encryption module 2468 of the mobile device 2450 may also serve to encrypt any data sent wirelessly or by wire from the mobile device interface 2460 to the internal interface 2410. The encryption module 2468 may also serve to decrypt any data received wirelessly or via wire by the mobile device interface 2460 to the internal interface 2410. Various types of data encryption techniques may be utilized that are well known in the art including: symmetric-key cryptography such as DES, AES, hashing functions (MD5, SHA-1, SHA-2, SHA-3, etc.); and asymmetric-key cryptography such as digital signature schemes like RSA and DSA. The encryption modules 2412 and 2468 may be implemented using hardware circuitry, or software.

The magnetic strip reader interface 2408 is configured to read magnetic strips on various payment cards, such as credit cards, debit cards, charge cards, pre-paid credit cards, and/or any other card based payment systems that utilize magnetic strips. Magnetic strip reader interface 2408 can be, for example, capable of reading standard three-track strip cards following the ISO/IEC standard 7811.

The magnetic strip reader interface 2408 is configured to read account information and other data associated with a magnetic strip payment card (hereinafter "Magcard"). In one example, account information and other data associated with the Magcard is read by the magnetic strip reader interface 2408 in connection with and/or to facilitate a purchase transaction. The account information and other data may then be transmitted via the bus 2413 to the magnetic strip reader processing circuit 2406. In other embodiments, the account information and other data may be transmitted via the bus 2413 to the memory module 2404 for storage. In one example, the magnetic strip reader processing circuit 2406 may be a programmable logic array that collects and/or forwards account information and other data directly received from the magnetic strip reader interface 2408. The magnetic strip reader processing circuit 2406 is responsible for instructing the magnetic strip reader interface 2408 to read or collect the account information and other data from the Magcard and provide such information via the internal interface 2410 to an application executed on the mobile device 2450.

The mobile device 2450 may execute a payment processing application (e.g., processing circuit 2454) that processes the account information and other data received from the payment processing accessory 2412. The payment processing application may be a unique application specially developed by a particular merchant account provider using the SDK 2458 on the mobile to communicate with the SDK 2416 on the payment processing accessory 2402. For example, detailed transaction information related to the particular transaction may be entered into an input interface 2452, such as a keyboard, touch-screen display, etc., of the mobile device 2450. Such information may include the purchase amount to be charged to the Magcard due on the transaction. Processing of such tasks may be carried out by the mobile device's processing circuit 2454. In one embodiment, the processing circuit 2454 performs these tasks by the executing payment processing application resident on the mobile device's memory module 2456. The payment processing applications resident on the memory module 2456 can similarly be specially developed by merchant account providers using an SDK 2458 resident on the operating system 2462 of the mobile device 2450.

Once the necessary account information and other data has been received by the mobile device 2450 from the payment processing accessory 2402, and any details regarding the purchase amount have been entered, the transmission and receive (Tx/Rx) circuit 2464 of the mobile device 2450 may wirelessly transmit the account information (e.g., credit card number) and purchase transaction information (e.g., transaction amount, etc.) through its wireless network to the merchant account provider for approval. The Tx/Rx circuit 2464 of the mobile device 2450 may also receive an acknowledgment message from the merchant account provider that the charge was approved. The acknowledgment message may be communicated to the purchaser or merchant via the output interface 2466 of the mobile device 2450.

Upon approval, a receipt detailing the transaction may be generated by the mobile device 2450. The receipt information may be transmitted wirelessly, or by wire contact, to a local printer for printing. In other embodiments, an email address associated with the purchaser or the Magcard may be entered into the mobile device 2450 via the input interface 2452. Then, upon approval of the transaction the receipt can be emailed to the email address entered by the mobile device 2450. In yet, other embodiments, a receipt detailing the transaction may be generated either before or after a signature is acquired from the purchaser via the input interface 2452.

In alternative implementations, the payment processing accessory 2402 may do more than collect or read information from a Magcard and provide it to the mobile device 2450 for performing a transaction. For instance, in cases where the mobile device may not have a connection to a network through which a transaction can be validated (e.g., through which a credit card payment can be approved), the payment processing accessory 2402 may itself include a wireless connection that is capable of communicating with a merchant account provider to validate the transaction. In some implementations, the payment processing accessory 2402 may be powered by the mobile device 2450 via the internal interface 2410, while in other implementations the payment processing accessory 2402 may have its own internal power source (e.g., power cell module 2316 in FIG. 23).

In yet other implementations, the payment processing accessory 2402 may include an input device to authenticate the user of the Magcard. For example, the payment processing accessory 2402 may include a finger print scanner that collects the payor's finger print and provide it to the mobile device 2450 via the internal interface 2410, The finger print information may be subsequently sent to a merchant account provider for verification as part of authenticating the payment using Magcard.

It should be understood that the payment processing accessory 2402 is not limited to just a magnetic card reader. In various implementations the payment processing accessory 2402 may include a smart card, proximity reader, and/or bar code scanner adapted to collect information from a payor's payment card or device.

Figure 25:
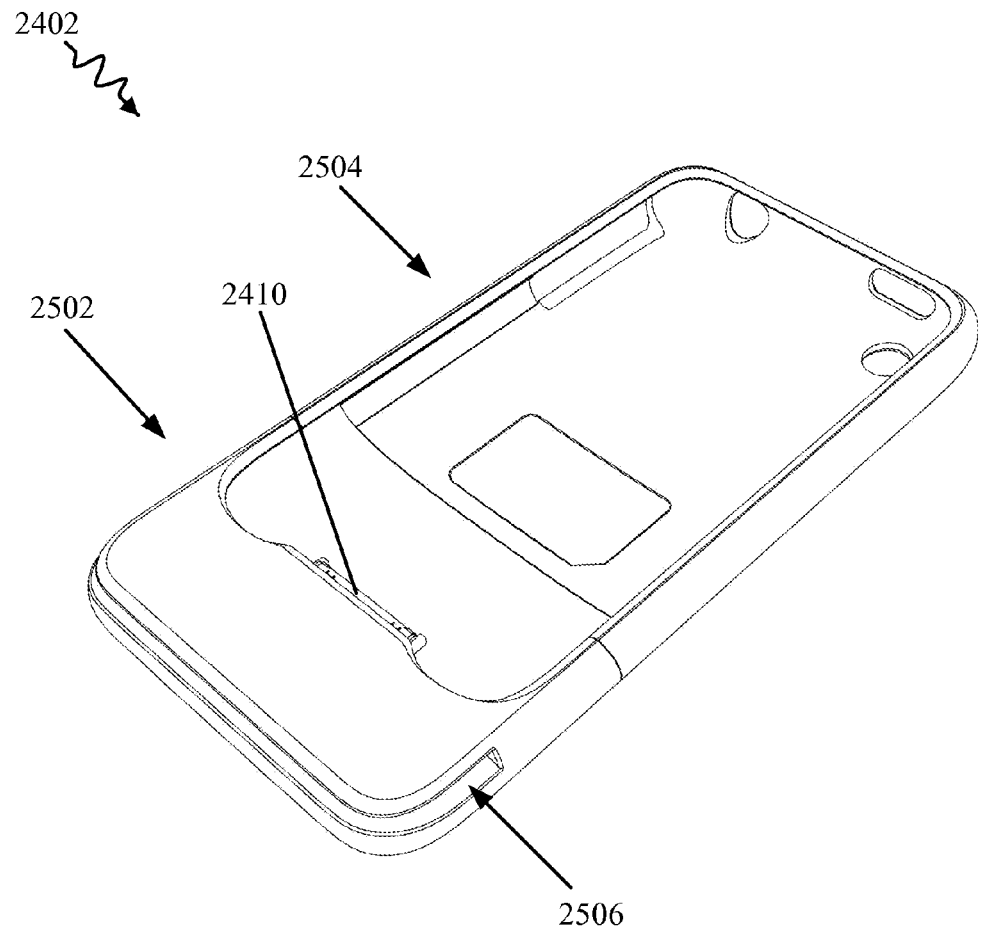
FIG. 25 illustrates a front perspective view of the payment processing accessory.

FIG. 25 illustrates a front perspective view of the payment processing accessory 2402. In one embodiment, the payment processing accessory 2402 comprises a bottom section 2502 and a top section 2504 that can be separated from each other to insert a mobile device within the payment processing accessory 2402. The circuits and/or components of the payment processing device 2402 may be housed within the bottom section 2502 and/or top section 2504. The two sections can then be coupled together to secure the mobile device in place. FIG. 25 also illustrates an embodiment of the payment processing accessory 2402 comprising a magnetic strip swiping region 2506 within which the magnetic strip reader interface (not shown) is housed. In this example, the magnetic strip swiping region 2506 is located along a bottom side of the mobile device 2450 so that it is not obstructed when the user holds the mobile device 2450 and payment processing accessory 2402 in his/her palm.

Figure 26:
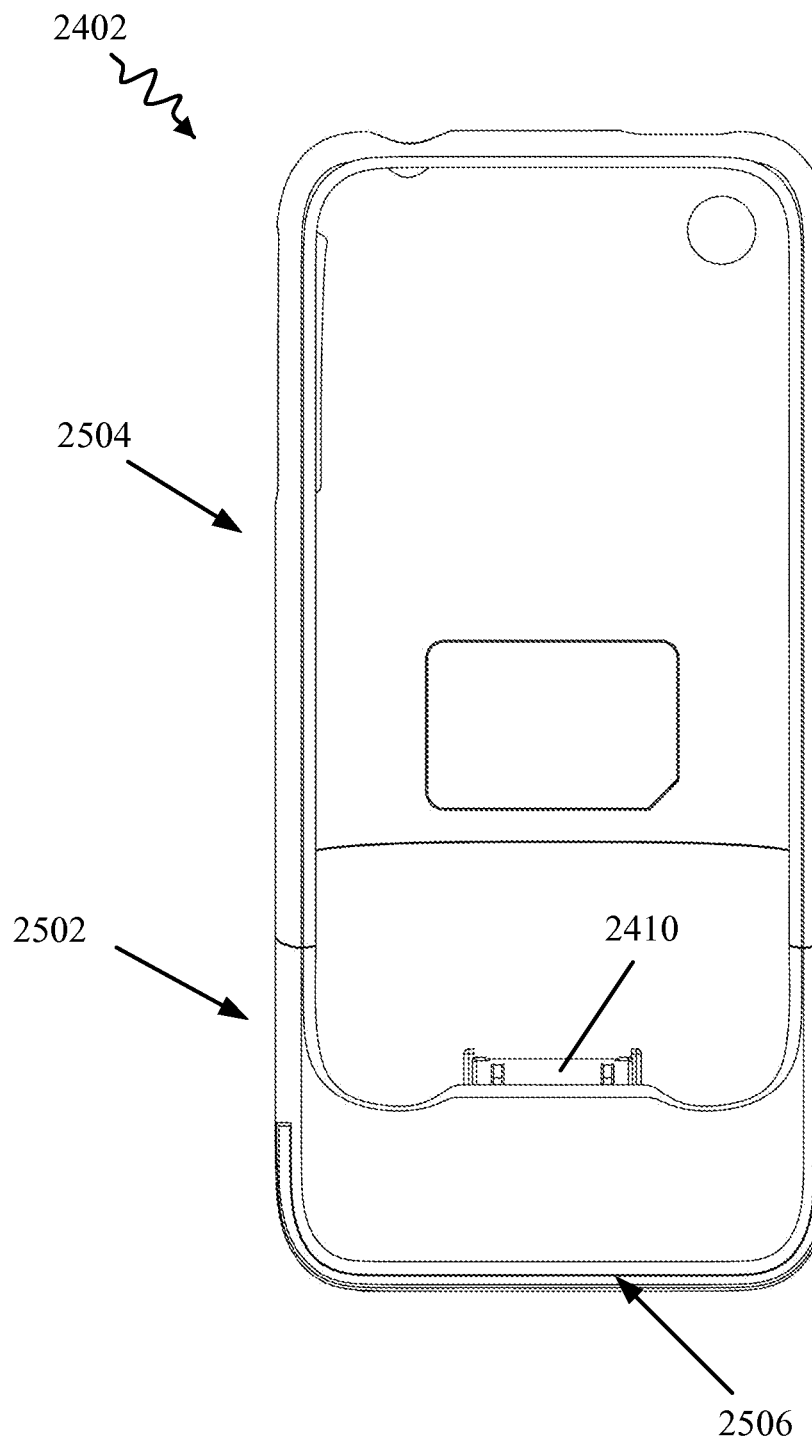
FIG. 26 illustrates a front view of the payment processing accessory.

FIG. 26 illustrates a front view of the payment processing accessory 2402.

Figure 27:
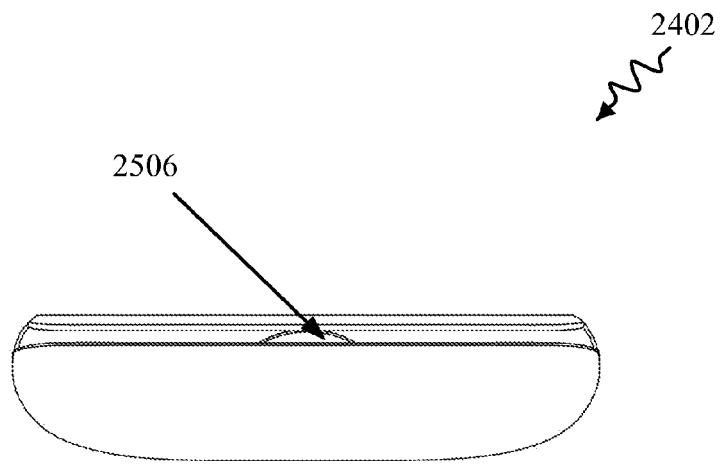
FIG. 27 illustrates a bottom view of the payment processing accessory.

FIG. 27 illustrates a bottom view of the payment processing accessory 2402.

Figure 28:
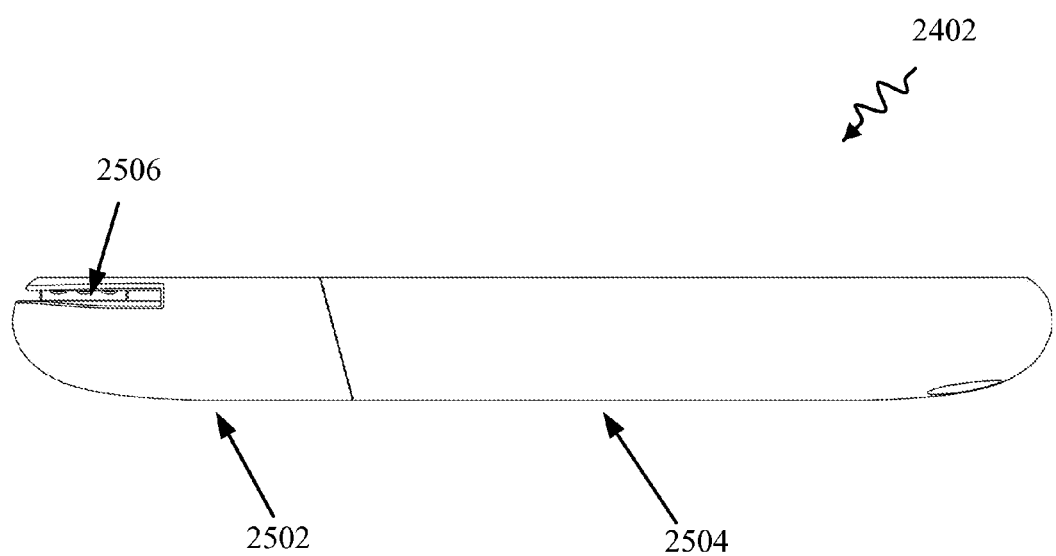
FIG. 28 illustrates a side view of the payment processing accessory.

FIG. 28 illustrates a side view of the payment processing accessory 2402.

Figure 29A:
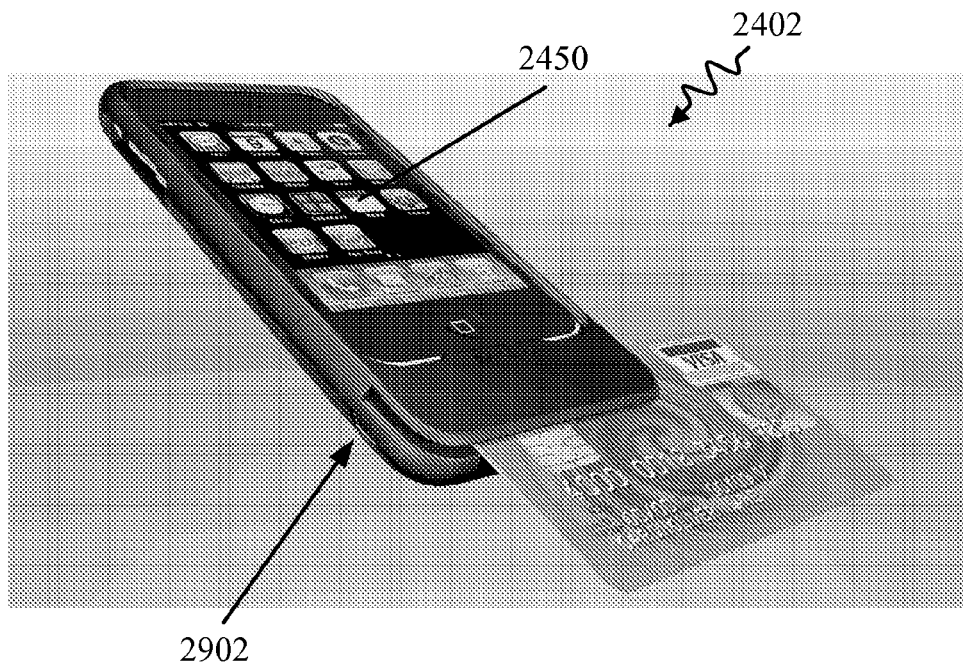
FIG. 29A and FIG. 29B illustrate front perspective views of a mobile device encased by the payment processing accessory.
Figure 29B:
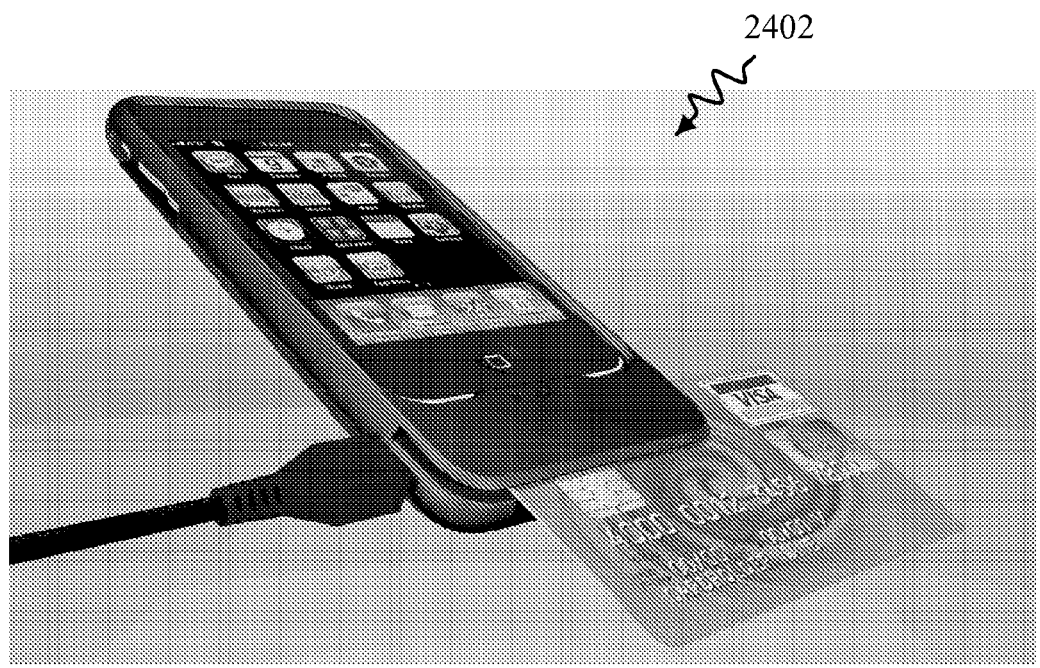

FIG. 29A and FIG. 29B illustrate front perspective views of a mobile device 2450 encased by the payment processing accessory 2402. Both figures also show a credit card being swiped through the magnetic strip reader. FIG. 29A illustrates an embodiment of the payment processing accessory 2402 that features a mini-USB interface 2902 for charging of the battery of the mobile device 2450, and/or external communication with the payment processing accessory 2402, and/or external communication with the mobile device 2450 via the payment processing accessory's internal interface (not shown). FIG. 29B illustrates how an interface cable may be connected to the mini-USB interface 2902 to charge the mobile device 2450.

Figure 30:
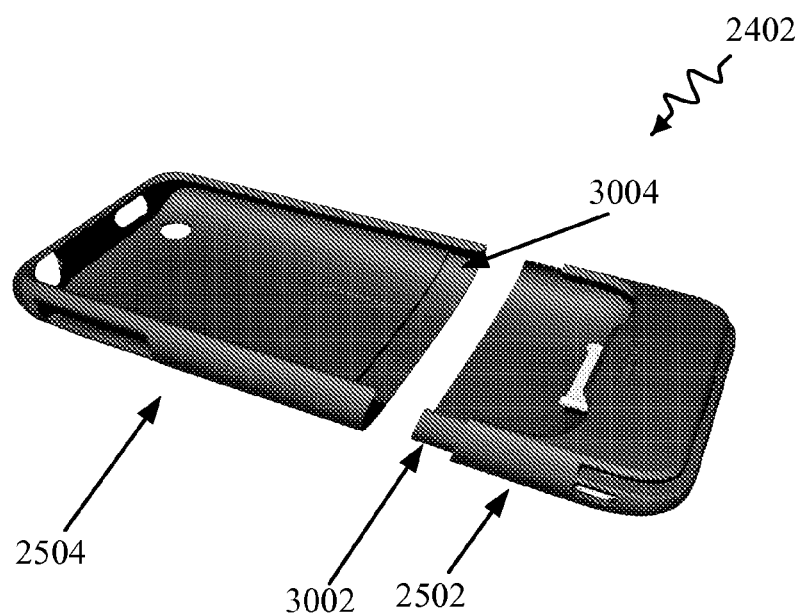
FIG. 30 illustrates a two-part payment processing accessory having a top section and a bottom section.
Figure 31:
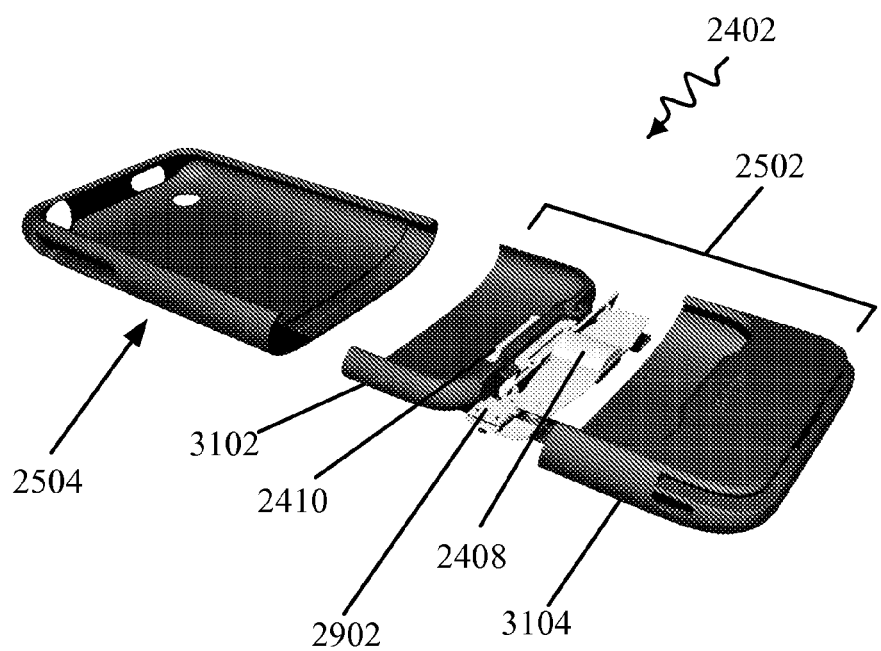
FIG. 31 illustrates the payment processing accessory with an exploded view of the bottom section.

FIGS. 30-31 illustrate the physical construction of the payment processing accessory 2402 according to one example.

FIG. 30 illustrates a two-part payment processing accessory 2402 having a top section 2504 and a bottom section 2502. The top section 2504 is detachable from the bottom section 2502. For example, the top section 2504 may include a female connector 3004 along an interfacing edge that receives male connector 3002 along an interfacing edge of the bottom section 2502. In this manner, the top section 2504 can be coupled to the bottom section 2502 by pressure fit. In various implementations, the top section 2504 and/or the bottom section 2502 may include processing and/or input/output capabilities. For instance, in one example, the bottom section 2502 may include a payment processing module (e.g., like the credit card reader) while the top section 2504 may include a power cell or a bar code scanner.

FIG. 31 illustrates the payment processing accessory 2402 with an exploded view of the bottom section 2502. For example, the bottom section 2502 may comprise an inner section 3102, an outer section 3104, the mini-USB interface 2902, the magnetic strip reader interface 2408, and the internal interface 2410. The inner section 3102 and outer section 3104 form a top and bottom shell in between which the mini-USB interface 2902 and the magnetic strip reader interface 2408 are substantially housed. A portion of the internal interface 2410 is also housed within the inner section 3102 and outer section 3104. Consequently, the mini-USB interface 2902, the magnetic strip reader interface 2408, and the internal interface 2410 may be housed within the thickness of the bottom section 2502 of the payment processing accessory 2402.

Figure 32A:
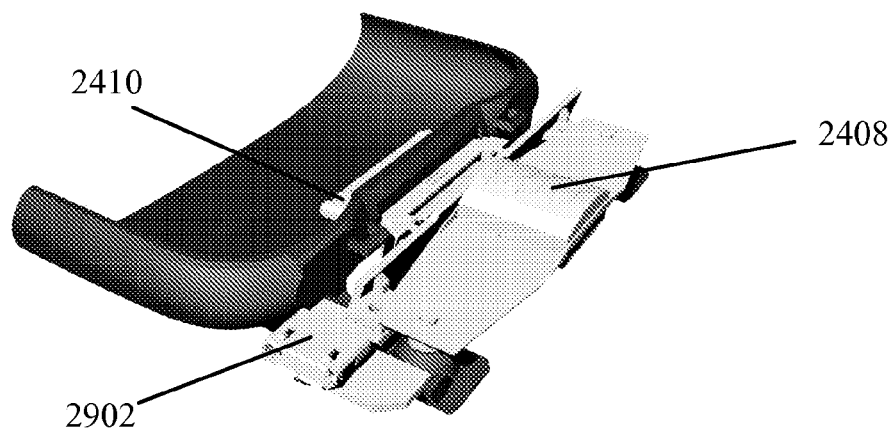
FIG. 32A-32C illustrate perspective views of the internal contents of the bottom section of the payment processing accessory.
Figure 32B:
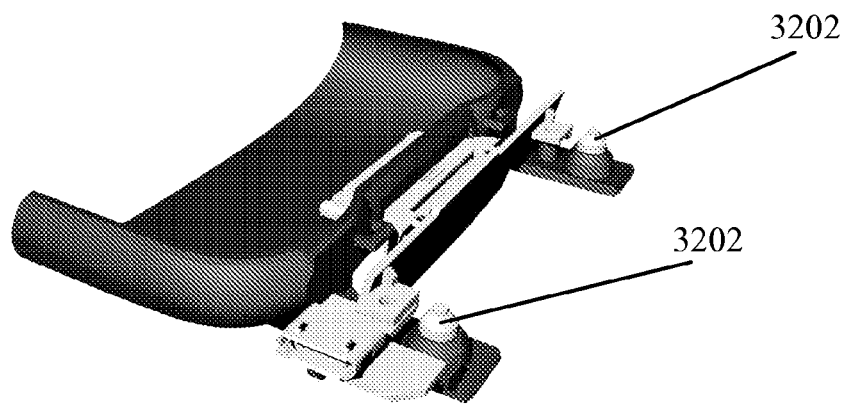
Figure 32C:
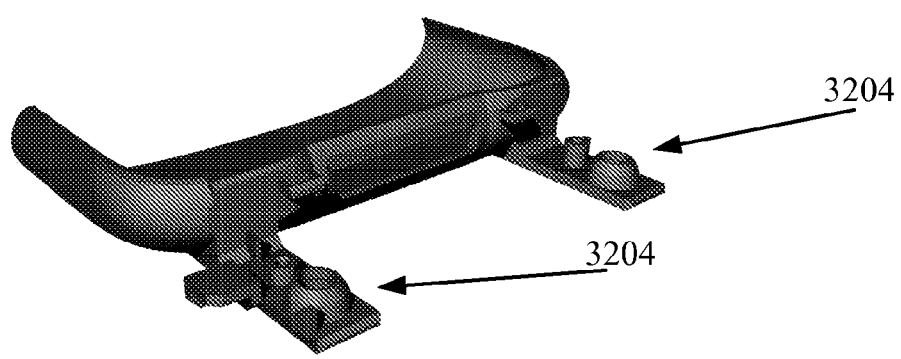

FIG. 32A illustrates a perspective view of the internal contents of the bottom section 2502, including, for example, the magnetic strip reader interface 2408, the internal interface 2410, and the mini-USB interface 2902. FIG. 32B illustrates a perspective view of the magnetic strip reader interface contact points 3202 to which the magnetic strip reader interface 2408 may secure to. FIG. 32C illustrates a perspective view of the mounting rails 3204 that secure the magnetic strip reader interface contact points 3202, the magnetic strip reader interface 2408, the internal interface 2410, and the mini-USB interface 2902.

In other embodiments, the payment processing accessory 2402 may be adapted to have an additional interface that is configured to read "chip and pin" based payment systems, such as, but not limited to, "smart cards." In yet other embodiments, the payment processing accessory 2402 may be adapted to have yet another interface that is configured to read radio frequency identification (RFID) tags that are associated with an electronic payment system of a merchant account provider. In yet other embodiments, the payment processing accessory 2402 may comprise only one of or any combination of: a magnetic card reader interface, chip and pin reader interface, and/or RFID reader interface.

Smart Card Reader Embodiment

Figure 33:
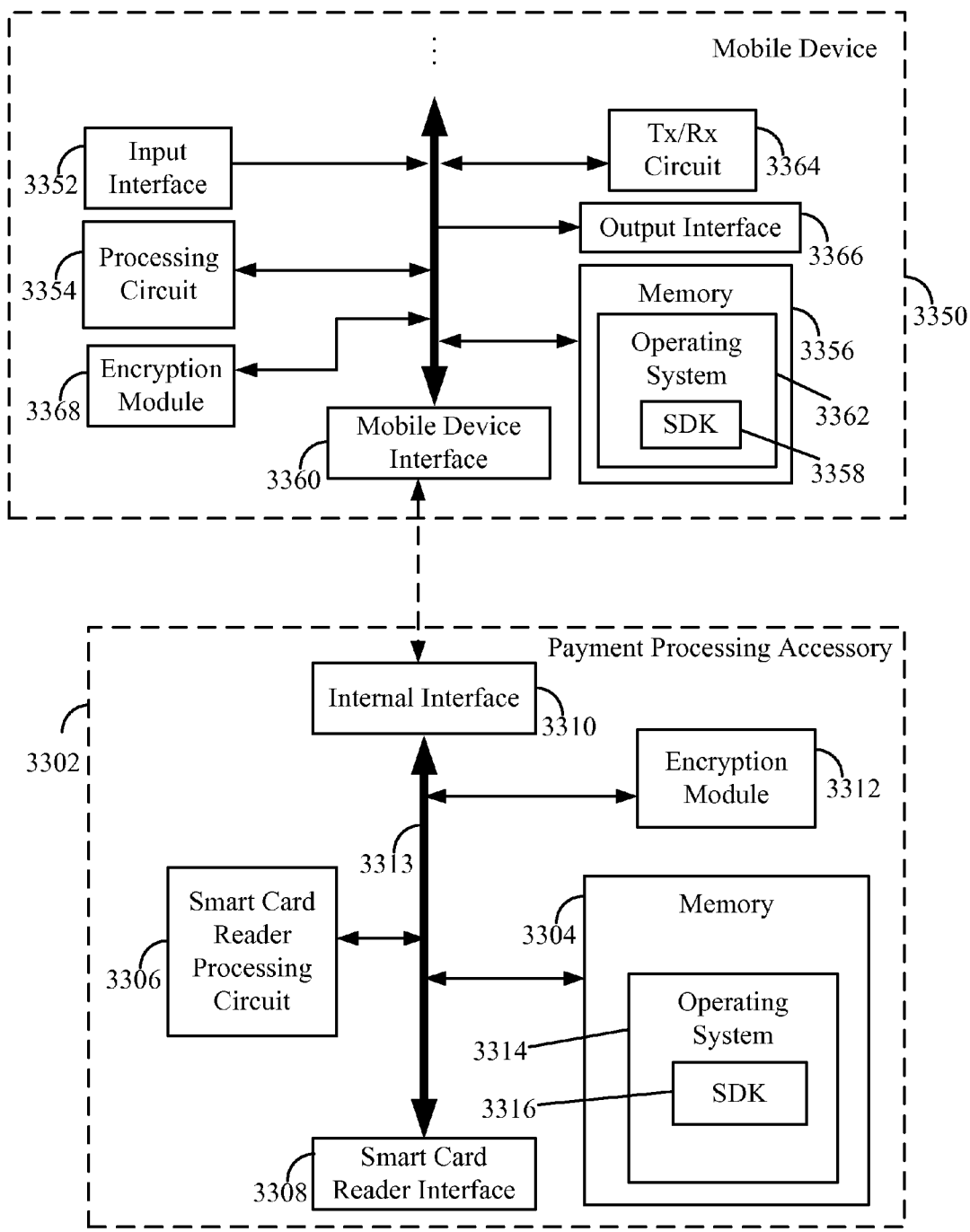
FIG. 33 illustrates a functional block diagram of one embodiment of a payment processing mobile accessory adapted to read data stored on a chip embedded into a payment card.

FIG. 33 illustrates a functional block diagram of another embodiment of a payment processing mobile accessory 3302 (also referred to as a "payment processing accessory 3302") adapted to read data stored on a chip embedded into a payment card, such as a smart card and/or contactless smart card. The payment processing accessory 3302 may comprise a memory module 3304, a smart card reader processing circuit 3306, a smart card reader interface 3308, an internal interface 3310, an encryption module 3312, and a bus 3313. The bus 3313 allows for communication between the memory module 3304, the smart card reader processing circuit 3306, the smart card reader interface 3308, the internal interface 3310, and the encryption module 3312.

The payment processing accessory 3302 functions very similar to the payment processing accessory 2402 in FIG. 24. The memory module 3304 may comprise an operating system 3314, and one or more software development kits (SDK) 3316. The memory module 2404 may comprise one or more independent computer data storage devices, such as, but not limited to, flash memory, ROM, RAM, hard disks, optical disks, solid-state memory such as flash memory, or any other computer data storage known in the art. The operating system (OS) 3314 can be any type of OS that adequately manages and coordinates the activities and sharing of the payment processing accessory's 3302 resources, such as, but are not limited to, Android™, iPhone OS™, Symbian OS™, BlackBerry OS™, Windows Mobile™, Linux, Palm webOS™, and Maemo™. The OS 3314 may also host a variety of computing applications that are resident on memory module 3304.

The smart card reader interface 3308 may be configured to read account information and other related data stored on a chip embedded into payment card, such as a smart card. In one embodiment, the smart card reader interface 3308 can be configured to accept and read data from a smart card featuring electrical contacts. In another embodiment, the smart card reader interface 3308 can be configured to accept and read data from a "contactless smart card." In such an embodiment, the smart card reader interface uses radio-frequency waves to communicate with the chip embedded within the contactless smart card. In either embodiment, account information and/or other related data stored on the chip within the smart card is read by the smart card reader interface 3308.

Once the account information and/or other data has been received by the mobile device 3350 from the payment processing accessory 3302, and any details regarding the purchase amount and user pin have been entered, the transmission and receive (Tx/Rx) circuit 3364 of the mobile device 3350 may wirelessly transmit the account information, pin information, and purchase transaction information through its wireless network to the merchant account provider for approval. The Tx/Rx circuit 3364 of the mobile device 3350 may also receive an acknowledgment message from the merchant account provider that the charge was approved. The acknowledgment message may be communicated to the purchaser or merchant via the output interface 3366 of the mobile device 3350.

Upon approval, a receipt detailing the transaction, may be generated by the mobile device 3350. The receipt information may be transmitted wirelessly, or by wire contact, to a local printer for printing. In other embodiments, an email address associated with the purchaser or the smart card may be entered into the mobile device 3350 via the input interface 3352. Then, upon approval of the transaction the receipt can be emailed to the email address entered by the mobile device 3350. In yet, other embodiments, a receipt detailing the transaction may be generated either before or after a signature is acquired from the purchaser via the input interface 3352.

Note that, in some implementations, a payment processing accessory may include a combination of payment input interfaces, such as a smart card reader interface 3308, a magnetic strip reader interface 2408, and/or other types of payment input interfaces.

Programmable Smart Card Mobile Accessory

In yet other implementations, a mobile accessory is provided that is capable of making payments via, for example, a programmable smart card interface built into the mobile accessory. For instance, a mobile device may include an application through which a user may enter one or more credit card, debit accounts, and/or payment information. The user may then select which form of payment or which account/card should be used for a particular transaction. The application may then send the selected account information to the mobile accessory which causes a smart card transmitter to be programmed with that information. The user may then place the mobile accessory proximate a smart card reader to effectuate payment of a transaction. In subsequent transactions, the user may select a different form of payment (e.g., different account or credit card) and repeat the process. This procedure may also be done with other types of programmable output interfaces. In this manner, the combination of the mobile device and mobile accessory may serve as a form of electronic wallet whereby a user may avoid having to carry the physical credit cards. This, in fact, may provide improved security over typical credit cards as the application may request user authentication (e.g., password required) prior to being able to use any of the accounts or cards stored therein.

Figure 34:
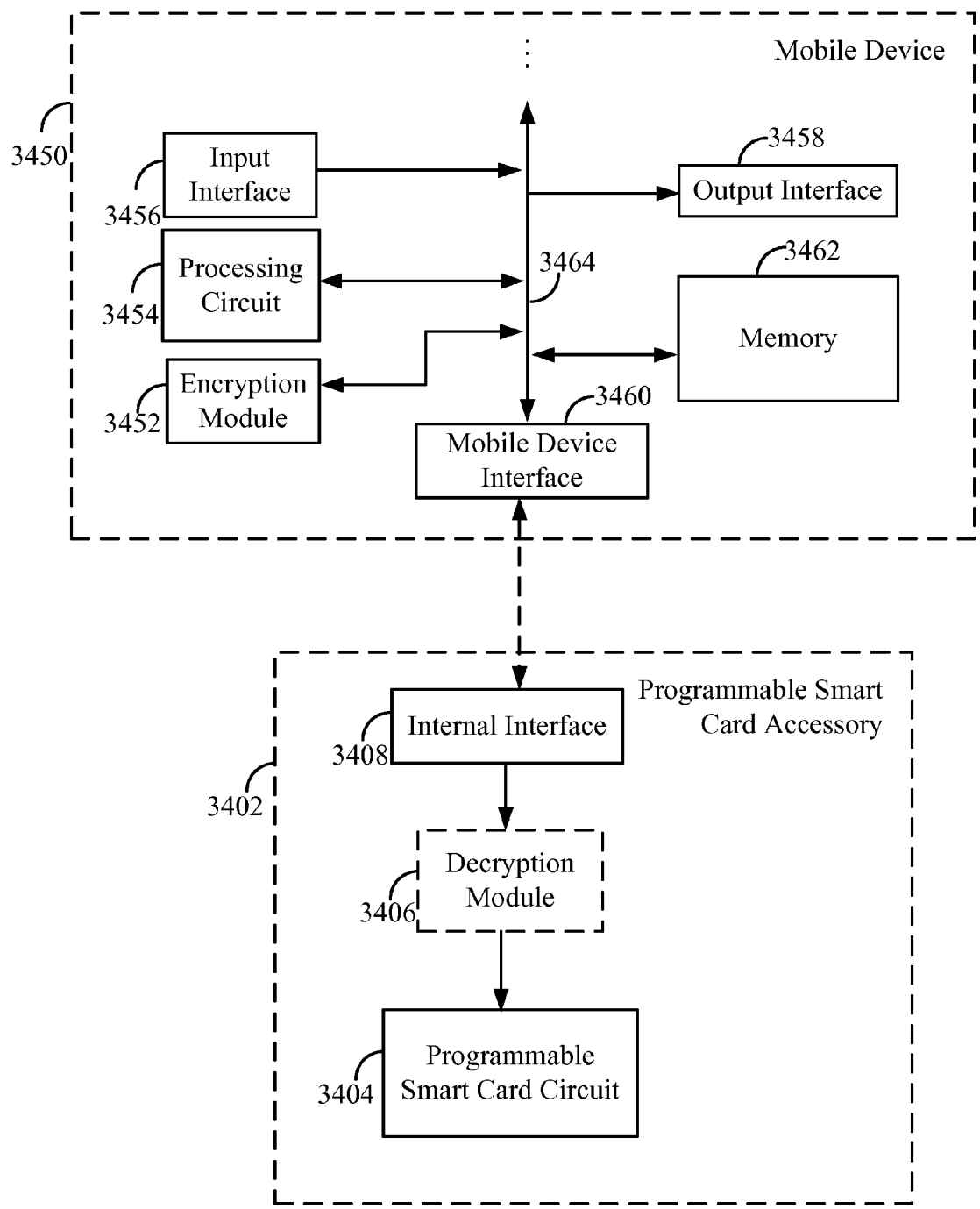
FIG. 34 illustrates a functional block diagram of a programmable smart card mobile accessory.

FIG. 34 illustrates a functional block diagram of a programmable smart card mobile accessory 3402. The programmable smart card mobile accessory 3402 may comprise a programmable smart card circuit 3404, an optional decryption module 3406, and an internal interface 3408. The programmable smart card mobile accessory 3402 is in communication with a mobile device 3450 that may comprise an encryption module 3452, a processing circuit 3454, an input interface 3456, an output interface 3458, a mobile device interface 3460, a memory 3462, and a bus 3464. The bus 3464 allows communication between the encryption module 3452, the processing circuit 3454, the input interface 3456, the output interface 3458, the mobile device interface 3460, and the memory 3462.

In one embodiment, the memory 3462 of the mobile device 3450 stores a software application associated with the programmable smart card mobile accessory 3402. A user of the mobile device 3450 may cause the software application to be executed by the processing unit 3454. During an initial setup procedure, the software application may collect account information associated with one or more payment cards or accounts, including, but not limited to, credit cards, debit cards, prepaid credit cards, charge cards, etc., for the user. For example, the user may manually enter a card number, an expiration date, a CVV code, a card holder name, and/or an address associated with each payment card via the input interface 3456, such as a keyboard or touch screen display. The information entered may be (securely) stored in the mobile device's memory 3462.

If the user chooses to pay for goods or services using one of the plurality of payment card information stored in the mobile device 3450, the user may execute the software application associated with the programmable smart card mobile accessory 3402. The software application may cause the output interface 3458 of the mobile device 3450 to display to the user a plurality of stored payment card information, The user may then select the desired payment card with which to complete the transaction via the input interface 3456 (e.g., a touch screen). For security, the information may then be encrypted by encryption module 3452 before it is transmitted by wire or wirelessly by the mobile device interface 3460 to the internal interface 3408 of the programmable smart card mobile accessory 3402.

At the programmable smart card mobile accessory 3402, the received information (e.g., the selected credit card information) may be decrypted by the decryption module 3406 before it is forwarded to the programmable smart card circuit 3404. The programmable smart card circuit 3404 then processes the information received for each payment card, and programs itself with the provided account information for the selected payment card. The programmed circuitry can later be read by a smart card reader for payment card information retrieval. In one embodiment, the programmable smart card circuit 3404 programs circuitry that can be read by a contactless smart card reader. In yet other embodiments, the programmable smart card circuit 3404 programs circuitry that can be read by a smart card reader requiring electrical or magnetic contacts. In this fashion, the mobile device 3450 may store a plurality of payment card information and the programmable smart card accessory 3402 may be configured to provide a selected payment card information (e.g., for a particular transaction) in a form that is readable by a smart card reader.

Television Signal Receiver and Battery Pack Mobile Accessory

Figure 35:
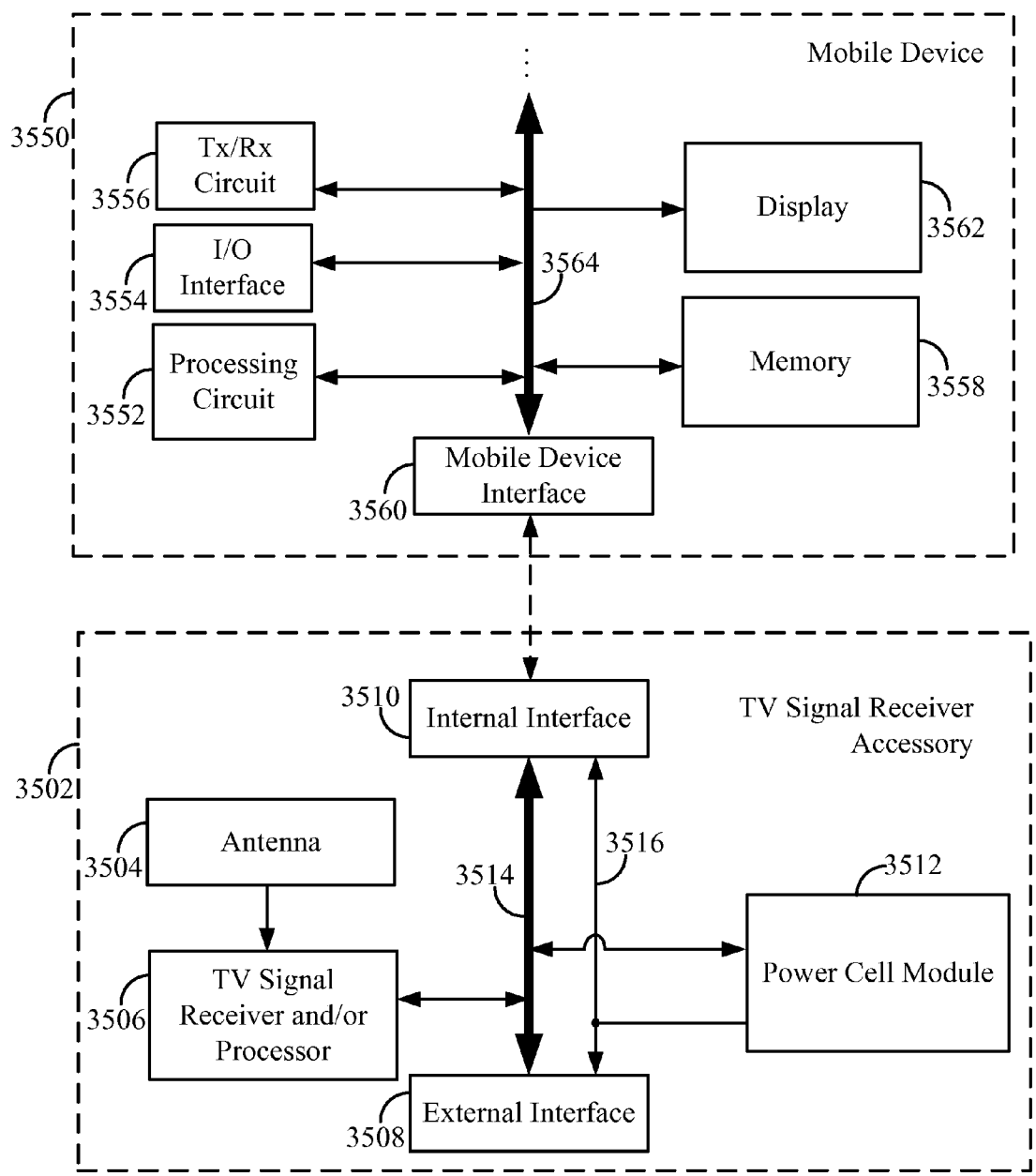
FIG. 35 illustrates a functional block diagram of a television signal receiver and battery pack mobile accessory.

FIG. 35 illustrates a functional block diagram of a television signal receiver and battery pack mobile accessory 3502 (hereinafter "TV receiver accessory 3502"). The TV receiver accessory 3502 may comprise an antenna 3504, a TV signal receiver and processor 3506, an external interface 3508, an internal interface 3510, a power cell module 3512, a data/communication bus 3514, and/or a power path/bus 3516. The data/communication bus 3514 may allow for communication between the TV signal receiver and processor 3506, the external interface 3508, the internal interface 3510, and/or the power cell module 3512.

The power cell module 3512 is an optional module that may comprise the power cell 1404, charge level indicator 1410, recharging module 1704, and switch 1412 of FIG. 17 (not shown in FIG. 35 for simplicity). The power cell module 3512 and its components perform all the functions of the battery pack described above. For example, the power cell module 3512 may provide power to the mobile device 3550 through the internal interface 3510 via the power path 3516.

The TV receiver accessory 3502 may be configured to receive and/or process analog and/or digital television signals, and transmit the television signal data to the mobile device 3550 for viewing on the mobile device output display 3562. In one embodiment of the TV receiver accessory 3502, the TV signal receiver and processor 3506 is configured to receive various types of television transmission signals through the antenna 3504. These television transmission signals may include, but are not limited to, one or more of the following: locally broadcast analog television signals, locally broadcast digital television signals, satellite digital multimedia broadcasting (S-DMB) signals, terrestrial digital multimedia broadcasting (T-DMB) signals, 1Seg signals, digital video broadcasting—handheld (DVB-H or DVB-H2) signals, and MediaFLO based signals, such as FLOTV™ signals. In other embodiments, the TV signal receiver and processor may also be configured to receive satellite digital audio radio service (SDARS) signals, such as XM™ and Sirius™ signals. In yet other embodiments, the TV receiver accessory 3502 may comprise additional circuitry and a separate antenna that is dedicated to receiving SDARS signals.

The TV signal receiver and/or processor 3506 performs any and all necessary analog and/or digital processing of any of the aforementioned signals received, and transmits the television signal data to the mobile device interface 3560 via the internal interface 3510.

The mobile device 3550 may comprise, among other things, a processing circuit 3552, an input and output (I/O) interface 3554, a transmission and receive (Tx/Rx) circuit 3556, memory 3558, the mobile device interface 3560, a display 3562, and/or a bus 3564. The bus 3564 may allow for communication between the processing circuit 3552, the I/O interface 3554, the transmit and/or receive (Tx/Rx) circuit 3556, memory 3558, the display 3562, and/or other components of the mobile device 3550.

The processing circuit 3552 may receive the television signal data received from the TV receiver accessory 3502 and perform further processing before transmitting the television signal data to the display 3562. In one embodiment, the mobile device's memory 3558 contains an application that can be executed by the processing circuit 3552 to further process the television signal data received. Furthermore, in one example, an application resident on the mobile device's memory 3558 can be executed by the processing circuit 3552 to allow a user of the mobile device 3550 to select a television program channel. For example, the user may use the input interface 3554 to select a channel, select recording options for recording select programs at select times, and change resolution and other display features.

In one embodiment, the user of the mobile device 3550 can utilize the Tx/Rx circuit 3556 of the mobile device 3550 to communicate with a television signal service provider (e.g., FLOTV™) to order and/or pay for select services. Communication may be performed wirelessly and carried out by the wireless network and/or service associated with the mobile device 3550.

In this manner, even though the mobile device 3550 may not have an integrated television tuner or circuit, the receiver accessory 3502 includes the hardware components, and/or processing capabilities to receive and/or process over-the-air television signals (e.g., analog and/or digital) and provide the content therein to the mobile device.

Exemplary Functionalities and/or Capabilities Mobile Accessories

Referring again to FIG. 23, in various implementations the external processing mobile accessory 2302 may comprise an input interface 2308*a* that is configured to scan bar codes, such as, but not limited to, universal product codes (UPC) and two dimensional bar codes. The processor 2306*a* may process the data scanned by the bar code scanning input interface 2308*a*, and transmit the product information to the mobile device 2350 via the internal interface 2310. An application resident on the mobile device's memory 2356 may enable the user of the mobile device 2350 to identify the product/item scanned and carry out certain functions including, updating inventory records, generating purchase/sale transactions, etc.

In another embodiment, the external processing mobile accessory 2302 may comprise an input interface 2308*a* that is configured to scan finger prints. The processor 2306*a* may process the finger print data scanned by the finger print reader input interface 2308, and transmit the finger print data to the mobile device 2350 via the internal interface 2310. An application resident on the mobile device's memory 2356 may be executed by the processing circuit 2354 to identify the finger print scanned. In one embodiment, the finger print scanned is compared to finger print data stored in either memory module 2304 and/or the mobile device memory 2356 for authentication. If the scanned finger print data matches finger print data stored then the user authentication is deemed successful and functionality of the mobile device 2350 is unlocked/allowed to the user.

In another embodiment, the external processing mobile accessory 2302 may comprise an input interface 2308*a* that is configured to wirelessly receive restaurant menu information that is broadcast locally from a dining establishment. The processor 2306*a* may process the data received from the input interface 2308*a*, and transmit the menu information data to the mobile device 2350 via the internal interface 2310. An application resident on the mobile device's memory 2356 may be executed by the processing circuit 2354 to cause the menu to be displayed on the mobile device's output interface 2362. In one embodiment, the user of the mobile device 2350 may then select one or more food or beverage items, and/or make other requests, and this information may then be transmitted via an output transmitter interface 2308*b* to a receiver of the dining establishment. In this fashion, a user can see the menu items available and order without the need for a menu or wait staff for assistance.

Single Piece Bottom Mounted Casing Embodiment

In other embodiments, any of the mobile accessories described herein, including the magnetic strip payment processing accessory 2402, the smart card payment processing accessory 3302, the programmable smart card mobile accessory 3402, the television signal receiver and battery pack mobile accessory 3502, the bar code reader mobile accessory, the finger print reader mobile accessory, and the menu viewing and ordering mobile accessory, may be housed within a casing that is substantially similar to that shown in FIG. 15. For example, the mobile accessory may be housed within a bottom section that attaches to the bottom side of the mobile device and does not include a top section. By removing the top section, the mobile accessory may be more compact in size and ergonomic so that it does not significantly increase or change the size, thickness, and/or shape of the mobile device secured there to.

Modular Mobile Accessory Configurations

In various implementations, the mobile accessory may include multiple different functionalities and/or capabilities. In order to allow a consumer to tailor the mobile accessory to his/her needs, the mobile accessory may be comprised separate modules or components that can be coupled together to create the physical enclosure of the mobile accessory.

Figure 36:
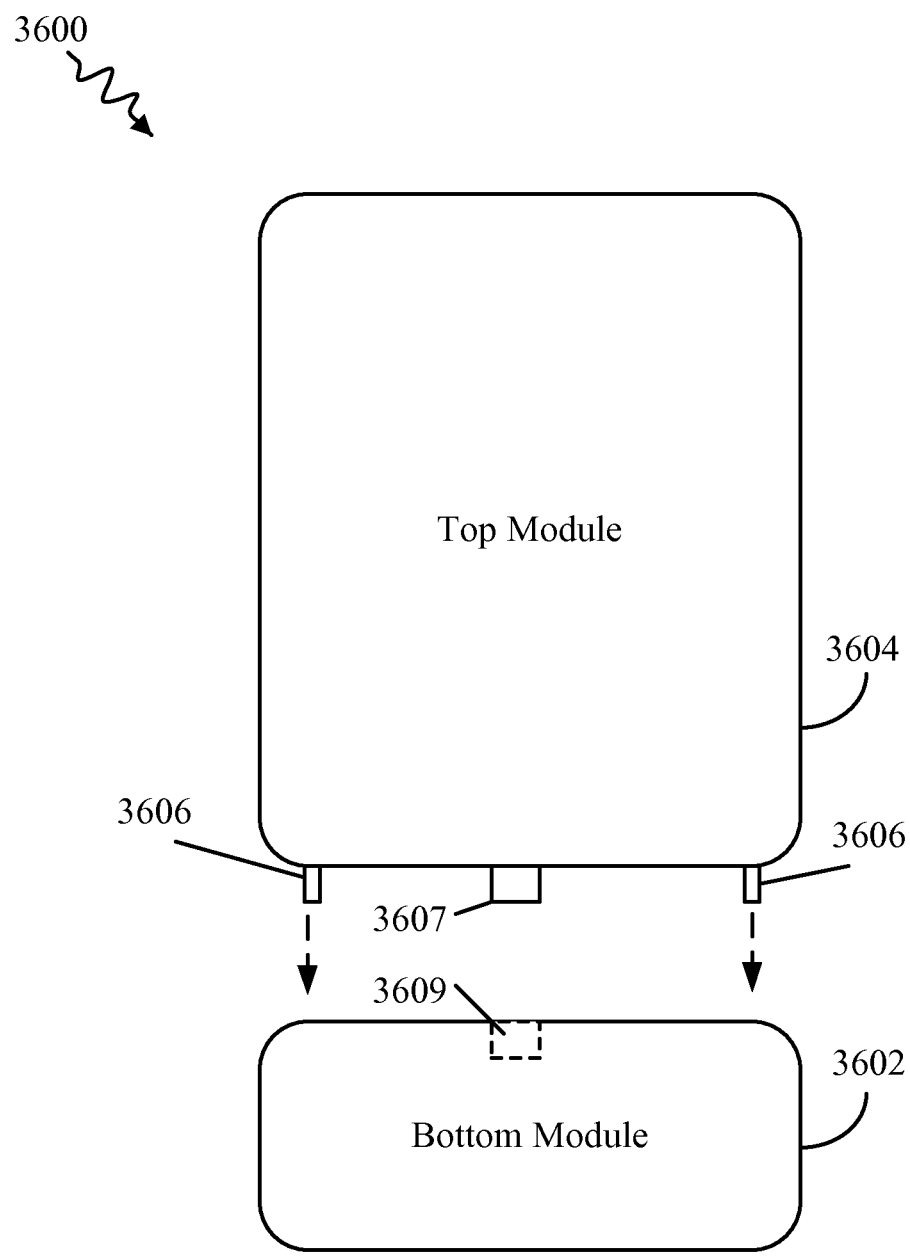
FIG. 36 illustrates a functional block diagram of a two-piece modular mobile device accessory scheme that comprises a bottom module and top module.
Figure 37:
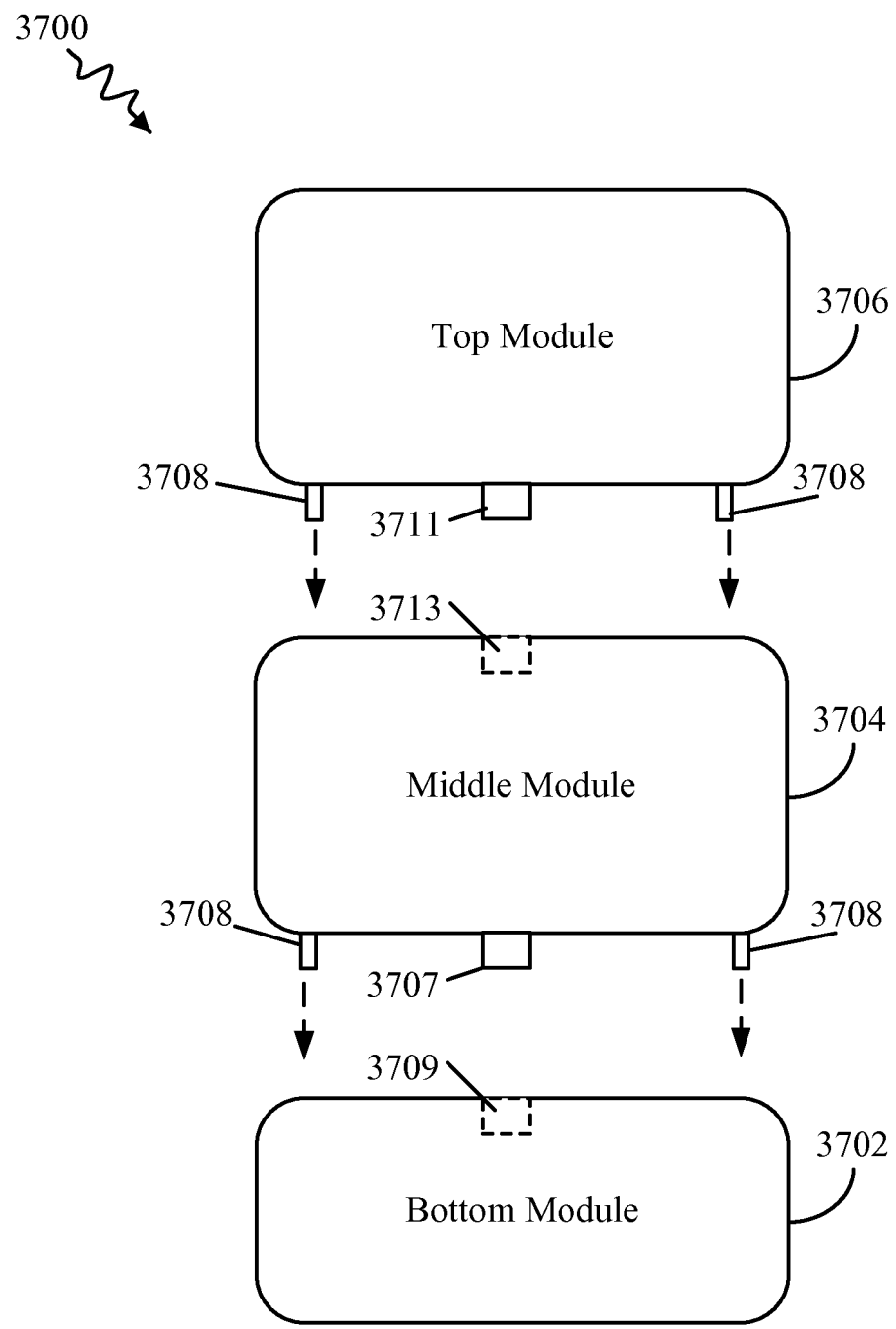
FIG. 37 illustrates a functional block diagram of a three-piece modular mobile device accessory scheme that comprises a bottom module, middle module, and top module.

FIGS. 36-37 illustrate various examples of a modular mobile accessory, where each module may provide a different functionality. Thus, a consumer is able to purchase the desired modules and combine them to form the enclosure of the mobile accessory.

FIG. 36 illustrates a two-piece modular mobile device accessory scheme 3600 that comprises a bottom module 3602 and top module 3604. Each module may incorporate circuits and/or devices that perform different functions, either alone or in combination with other modules. For instance, each module may house any one of the mobile accessories described above. For example, bottom module 3602 and top module 3604 can each be a battery pack, a magnetic strip payment processing accessory 2402, a smart card payment processing accessory 3302, a programmable smart card mobile accessory 3402, a television signal receiver and battery pack mobile accessory 3502, a bar code reader mobile accessory, a finger print reader mobile accessory, and/or a menu viewing and ordering mobile accessory.

The top module 3604 and bottom module 3604 may join together via contact points 3606 to substantially enclose a mobile device contained therein. For example, each contact point 3606 may include a pin that engages a corresponding cavity in the opposite module. In alternative implementations, the contact point 3606 may be a magnetic coupler between the top and bottom modules 3604 and 3602. Additionally, the modules 3602 and 3604 may include corresponding connectors 3607 and 3609 (e.g., male/female connectors) that may electrically couple the two modules together to allow for electrical communication (e.g., data and/or control signals) and/or power transfer between the two modules 3602 and 3604. For example, the top module 3604 may be a battery pack and the bottom module 3602 may be a magnetic strip payment processing accessory 2402. In such a configuration, the connectors 3607/3609 may provide power to the magnetic strip payment processing accessory in the bottom module 3602 from the battery pack in the top module 3604.

FIG. 37 illustrates a functional block diagram of a three-piece modular mobile device accessory scheme 3700 that comprises a bottom module 3702, middle module 3704, and top module 3706. Each module may incorporate circuits and/or devices that perform different functions, either alone or in combination with other modules. For instance, each module may house any one of the mobile accessories described above. For example, the bottom module 3702, middle module 3704, and top module 3706 can each be a battery pack, a magnetic strip payment processing accessory 2402, a smart card payment processing accessory 3302, a programmable smart card mobile accessory 3402, a television signal receiver and battery pack mobile accessory 3502, a bar code reader mobile accessory, a finger print reader mobile accessory, or a menu viewing and ordering mobile accessory.

The bottom module 3702, middle module 3704, and top module 3706 may be secured together via contact points 3708 to substantially enclose a mobile device contained therein. That is, the contact points 3708 may provide physical connectors between the modules 3702, 3704, and 3706.

Additionally, the modules 3702, 3704, and 3706 may include corresponding connectors 3707/3709 and 3711/3713 (e.g., male/female connectors) that may electrically couple the modules together to allow for electrical communication (e.g., data and/or control signals) and/or power transfer between the three modules 3702, 3704, 3706. For example, the top module 3706 may be a bar code scanner, the middle module 3704 may be finger print reader, and the bottom module 3702 may be a credit card reader (e.g., magnetic strip payment processing accessory 2402). In such a configuration, the connectors 3707/3709 and 3711/3713 may provide data and/or control signal communications between the modules 3702, 3704, and/or 3706 and, possibly, with the mobile device to which the mobile device accessory 3700 may couple.

The above modular schemes allow multiple mobile accessories to be used with one mobile device at the same time. Moreover, rather than having a top section 2504 that merely secures the bottom section 2502 and protects the mobile device enclosed within, the top, middle, and/or bottom modules of the modular schemes illustrated in FIGS. 36 and 37 may serve to add a plurality of different combinations of functions or capabilities to the mobile device since some of the modules may be interchangeable. For example, a user may select have two modules with battery pack and a third module with a television receiver. Alternatively, a user may select a first module with a bar code scanner, a second module with a credit card reader, and a third module with a programmable smart card device.

Data Management Mobile Accessory

Figure 38:
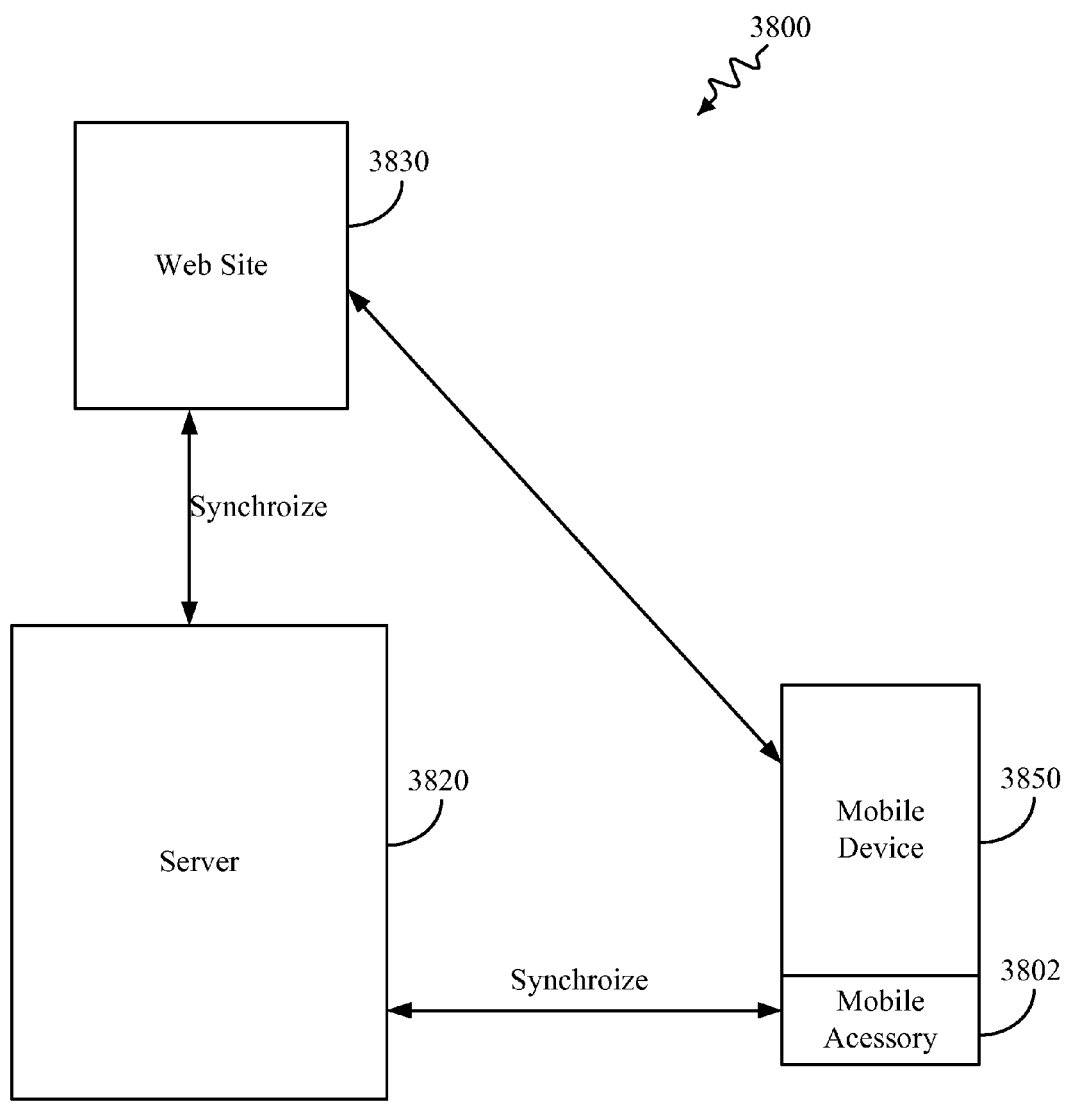
FIG. 38 illustrates a functional block diagram of a data management system that allows a mobile device equipped with a data management mobile accessory to synchronize with and update data stored on a server.

FIG. 38 illustrates a functional block diagram of a data management system 3800 that allows a mobile device 3850 equipped with a data management mobile accessory 3802 to synchronize with and update data stored on a server 3820. For example, the server 3820 may store inventory/product information for one or more distribution centers or warehouses. This inventory/product information may comprise, but is not limited to, type, quantities, images, prices, stock-keeping unit (SKU) identifiers, availability, shipping information, and/or origin of various products. The server 3820 systematically tracks the movement, e.g., in or out, of the products within the one or more distribution centers.

The server 3820 may also be synchronized with a website 3830. The website 3830 may display products and product information associated with the server 3820 to the anyone accessing the website 3830. The website 3830 may also be configured to process purchase orders of the products, and is capable of updating inventory/product information stored in the server 3820.

Figure 39:
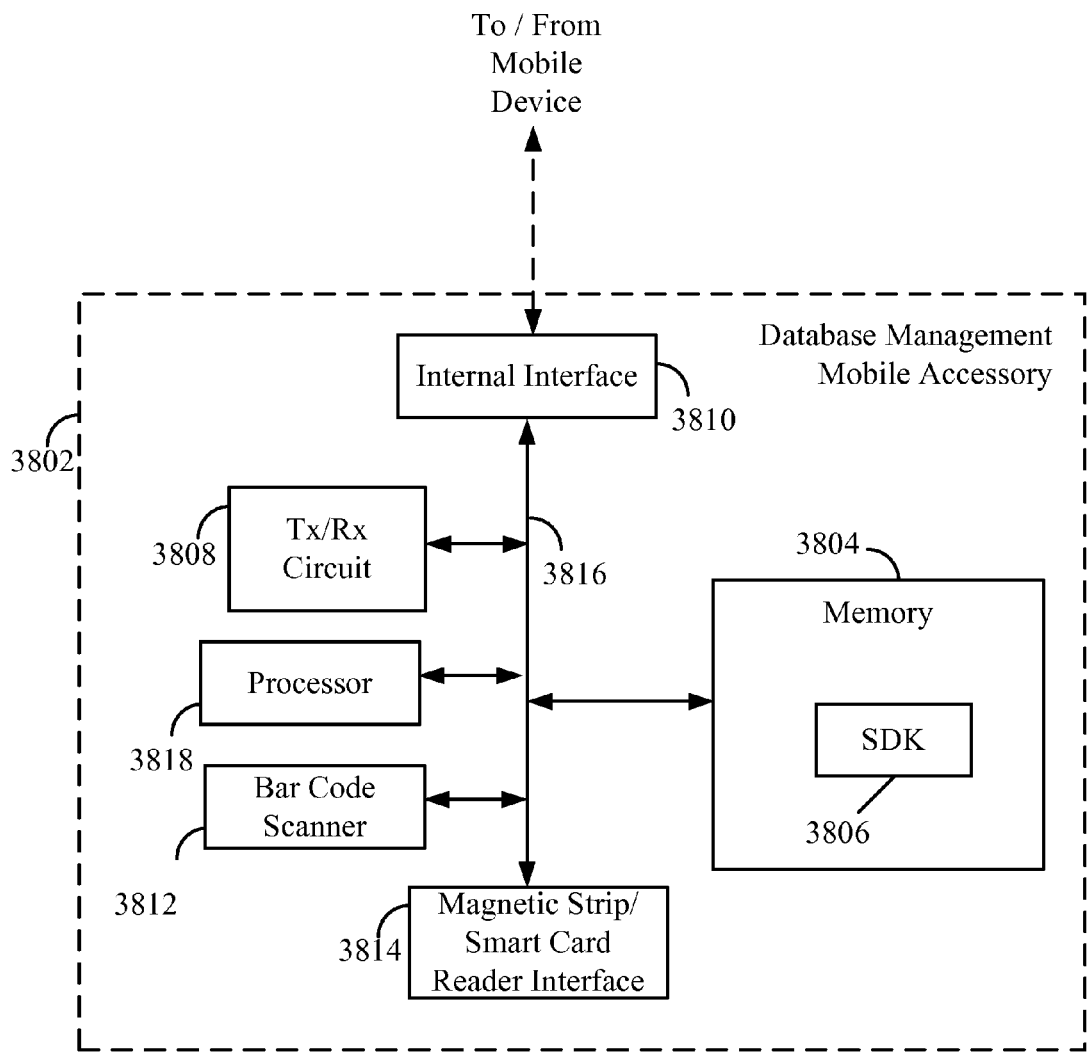
FIG. 39 illustrates a functional block diagram of one embodiment of the data management mobile accessory.

Referring to FIG. 38 and FIG. 39, the data management mobile accessory 3802 and mobile device 3850 include hardware and software that allow it to synchronize with and communicate to the server 3820. For example, a unique database management application for a particular data management system 3800 can be designed and created using the SDK 3806 tools available on the data management mobile accessory's memory 3804. The database management application can be loaded onto and executed on the mobile device 3850 through the internal interface 3810. The database management application allows the user of the mobile device 3850 to connect to and synchronize with the server 3820 using the data management mobile accessory 3802. For example, the data management mobile accessory 3802 may include a transmitter and receiver circuit 3808 (Tx/Rx Circuit) that allows it to wirelessly connect to the server 3820 in order to update any changes that need to be made to the inventory/product information stored within the server 3820, or otherwise access the contents of the server 3820.

In one embodiment, the database management application allows the user of the mobile device 3850 to connect to and synchronize with the server 3820 via the website 3830. The mobile device 3850 can connect to the website 3830 using the wireless network service provider associated with the mobile device 3850. The user of the mobile device 3850 may then wirelessly update any changes that need to be made to the inventory/product information stored within the server 3820, or otherwise access the contents of the server 3820.

In other embodiments, the data management mobile accessory 3802 may further comprise a processor 3818, a bar code scanner 3812, a magnetic strip/smart card reader interface 3814, and a bus 3816. The bus 3816 serves as a line of communication between the internal interface 3810, the processor 3818, the Tx/Rx circuit 3808, the memory 3804, the bar code scanner 3812, and the magnetic strip/smart card reader interface 3814. The bar code scanner 3812 allows the user of the data management mobile accessory 3802 to scan items/products, and update the inventory/product information stored within the server 3820. For example, scanning an item may increment the quantity value stored within the server 3820 for that particular product. The magnetic strip/smart card reader interface 3814 enables the user of the data management mobile accessory 3802 to accept payment card information from a consumer for a sale transaction according to one of the processes described above under "Payment Processing Mobile Accessories." If a sale is made the data management mobile accessory 3802 can update the inventory/product information stored within the server 3820 by, for example, decrementing the quantity value stored within the server 3820 for that particular product sold.

Speakers & Microphone

Another feature may provide for one or more speakers to be included as part of the battery packs or holster (illustrated in FIGS. 1-22). For instance a low-profile speaker may be housed within the back plane of a battery pack so that the sound may be emitted from the rear or sides of the battery pack. When a mobile device is inserted and coupled to the battery pack, it couples to an interface that electrically connects the speaker to the mobile device. The mobile device may send audio or sound signals to the speaker via an interface with the battery pack. This allows a user to listen to audio stored in the mobile device without the need for headphones.

Similarly, another feature may provide for one or more microphones to be included as part of the battery packs (illustrated in FIGS. 1-22). One or more microphones may be housed within the battery pack (e.g., backplane) so that they may capture sound from a user. The microphone may be electrically coupled to an interface that allows sending captured audio signals to a mobile device that may be coupled to the battery pack.

According to yet another feature, when the mobile device is coupled to the battery pack 1702, it may cause one or more applications to execute on the processors 1706. These applications may continue to operate or execute even if the mobile device is removed or decoupled from the battery pack 1702. For example, the battery pack may continue to collect data (e.g., monitor medical conditions for a patient to which it is coupled) and wirelessly transmits the collected data or an alarm to the mobile device. This is possible since the processors 1706 may be powered by the power cell 1404 and can be configured to operate whether or not the mobile device is coupled to the battery pack.

Integrated Display

In some embodiments of the battery pack 1702, battery pack 1702 may also include an integrated display or screen. For example, the integrated display may be on the outer surface of the back plane of the battery pack. Alternatively, the display 1710 may slide out from within the housing of the battery pack. This integrated display 1720 may allow displaying additional information or data to a user. The additional display screen may be electrically coupled to the mobile device (via an interface) to allow the mobile device to send images or video to the additional display screen.

In another example, the rear of the back plane may house a Braille input and/or output interface that electrically coupled a mobile device mounted within the holster or battery pack.

In yet another embodiment, the rear of the back plane may provide a keypad that serves as an input to the mobile device.

According to another feature, the battery pack and/or holster may provide an external interface (e.g., Bluetooth wireless interface, USB port, infrared port, etc.) that may allow the mobile device mounted in the battery pack and/or holster to communicate via that external interface. Thus the external interface may provide a different wireless interface than provided or supported by the internal system of the mobile device.

One or more of the features illustrated in FIGS. 1-39 may be rearranged and/or combined into a single component or embodied in several components. Additional components may also be added without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

I claim:

1. A modular mobile accessory, comprising:
a plurality of modules mechanically coupled to each other to form a casing that defines a cavity that conforms, at least partially, to an outer shape of a mobile communication device;
a first module, from the plurality of modules, adapted to perform at least one of a first input, output, and processing task; and
a second module, from the plurality of modules, adapted to perform at least one of a second input, output, and processing task.

2. The modular mobile accessory of claim 1, further comprising:
a third module, from the plurality of modules, adapted to perform a third input, output, or processing task.

3. The modular mobile accessory of claim 1, wherein the first and second modules are communicatively coupled to each other to transfer at least one of data and power between the first module and second module.

4. The modular mobile accessory of claim 1, wherein at least one of the plurality of modules is communicatively coupled to the mobile device and the plurality of modules are communicatively coupled to each other, thereby allowing for communication between the mobile device and each of the modules.

5. The modular mobile accessory of claim 1, wherein the plurality of modules are communicatively coupled to the mobile device by a wireless communication interface.

6. The modular mobile accessory of claim 1, wherein the plurality of mobile accessory modules are communicatively coupled to each other by induction.

7. The modular mobile accessory of claim 1, wherein the plurality of mobile accessory modules are communicatively coupled to each other by an electrical communication interface.

8. The modular mobile accessory of claim 1, wherein the first module is adapted to perform as at least one of: a battery pack, a magnetic strip payment processing accessory, a smart card payment processing accessory, a programmable smart card mobile accessory, a television signal receiver accessory, a TV receiver accessory, a bar code reader mobile accessory, a finger print reader mobile accessory, and a medical processing unit.

9. The modular mobile accessory of claim 1, wherein the first module is adapted to perform as a battery pack while the second module is adapted to perform as at least one of a magnetic strip payment processing accessory, a smart card payment processing accessory, a programmable smart card mobile accessory, a TV receiver accessory, a bar code reader mobile accessory, a finger print reader mobile accessory, and a medical processing unit.

10. The modular mobile accessory of claim 1, wherein the first module is interchangeable with a third module that is adapted to perform at least one of a third input, output, and processing task, wherein the third module and second module mechanically couple to each other to form the casing defining the cavity that conforms, at least partially, to the outer shape of the mobile communication device.

11. The modular mobile accessory of claim 1, wherein the first module transmits electrical power to the second module.

12. A modular mobile accessory configured to couple to a mobile device, comprising:
a first module, configured to mechanically and electrically couple to the mobile device; the first module further comprising:

a first external interface configured to receive a first set of data;
a first processor configured to manipulate the received first set of data resulting in processed data; and
a first internal interface configured to communicate the processed data to the mobile device;
a second module, configured to mechanically and electrically couple to the first module to form a casing that defines a cavity that conforms, at least partially, to the outer shape of the mobile device; the second module further comprising:
a second external interface configured to receive a second set of data; and
a second internal interface configured to communicate the second set of data with the first external interface.

13. The modular mobile accessory of claim 12, wherein the first and second modules are communicatively coupled to each other to transfer power between the first module and second module.

14. The modular mobile accessory of claim 12, wherein either the first module or the second module communicates with the mobile device via a wireless communication interface.

15. The modular mobile accessory of claim 12, wherein the first module and the second module communicate with each other via induction.

16. The modular mobile accessory of claim 12, wherein the first module is adapted to perform as at least one of: a battery pack, a magnetic strip payment processing accessory, a smart card payment processing accessory, a programmable smart card mobile accessory, a television signal receiver accessory, a TV receiver accessory, a bar code reader mobile accessory, a finger print reader mobile accessory, and a medical processing unit.

17. The modular mobile accessory of claim 12, wherein the first module is adapted to perform as a battery pack while the second module is adapted to perform as at least one of a magnetic strip payment processing accessory, a smart card payment processing accessory, a programmable smart card mobile accessory, a TV receiver accessory, a bar code reader mobile accessory, a finger print reader mobile accessory, and a medical processing unit.

18. The modular mobile accessory of claim 1, further comprising:
a third module, configured to mechanically and electrically couple to the first module or the second module; the third module further comprising:
a third external interface configured to receive a third set of data; and
a third internal interface configured to communicate the third set of data with the first external interface or the second external interface.

19. The modular mobile accessory of claim 18, wherein the first module is interchangeable with third module, wherein the third module and second module mechanically couple to each other to form the casing defining the cavity that conforms, at least partially, to the outer shape of the mobile communication device.

20. The modular mobile accessory of claim 12, wherein the first module transmits electrical power to the second module.

* * * * *